US012523153B2

(12) United States Patent
Dym

(10) Patent No.: US 12,523,153 B2
(45) Date of Patent: Jan. 13, 2026

(54) BIDIRECTIONAL ROTARY HYDRAULIC MOTOR AND PUMP

(71) Applicant: Herbert Dym, Poughkeepsie, NY (US)

(72) Inventor: Herbert Dym, Poughkeepsie, NY (US)

( * ) Notice: Subject to any disclaimer, the term of this patent is extended or adjusted under 35 U.S.C. 154(b) by 0 days.

(21) Appl. No.: 19/040,799

(22) Filed: Jan. 29, 2025

(65) Prior Publication Data
US 2025/0172068 A1 May 29, 2025

Related U.S. Application Data

(62) Division of application No. 18/582,521, filed on Feb. 20, 2024, now Pat. No. 12,247,489, which is a
(Continued)

(51) Int. Cl.
F01C 1/067 (2006.01)
F01C 21/08 (2006.01)
(Continued)

(52) U.S. Cl.
CPC .............. F01C 1/067 (2013.01); F01C 21/08 (2013.01); F01C 21/0845 (2013.01); F04C 2/3442 (2013.01); F04C 15/0061 (2013.01)

(58) Field of Classification Search
CPC .......... F01C 1/063; F01C 1/067; F01C 1/344; F01C 1/3446; F01C 21/08; F01C 21/0827;
(Continued)

(56) References Cited

U.S. PATENT DOCUMENTS 644,256 A    2/1900   Montgomery
839,764 A    12/1906  Isakson
(Continued)

FOREIGN PATENT DOCUMENTS

CA    1 235 605      4/1988
EP    0 153 766 A1   4/1985

OTHER PUBLICATIONS

US Notice of Allowance, U.S. Appl. No. 18/582,521, Applicant: Herbert Dym, Mail date: Nov. 6, 2024, 7 pages.
(Continued)

Primary Examiner — Craig M Schneider
(74) Attorney, Agent, or Firm — Saile Ackerman LLC; Stephen B. Ackerman; Rosemary L. S. Pike

(57) ABSTRACT

A hydraulic device comprises a rotary toroidal piston chamber having a rectangular space with a bottom, two sidewalls, and an open top. Four stationary pistons and two retractable gates for each piston are within the toroidal chamber mounted on a chamber wheel fixed to an axle on which it rotates, wherein the pistons and the gates are evenly spaced around the toroidal chamber separating the chamber into four partitions. A piston support for each piston is configured to hold the piston stationary while the piston chamber rotates. A stationary cover encircles and seals the open top of the piston chamber wherein openings through the stationary cover allow each of the piston supports to pass through and be sealed. An input port opening and an output port opening are in the stationary cover for each partition. The piston chamber rotates by reacting directly to continuous hydraulic force on the stationary pistons.

12 Claims, 26 Drawing Sheets

Related U.S. Application Data division of application No. 18/074,817, filed on Dec. 5, 2022, now Pat. No. 11,952,899.

(51) Int. Cl.
*F04C 2/344* (2006.01)
*F04C 15/00* (2006.01)

(58) Field of Classification Search
CPC .. F01C 21/0836; F01C 21/0845; F04C 2/344; F04C 2/3442; F04C 2/3446; F03B 3/00; F03B 3/18; F03B 3/183; F03B 5/00; F03B 15/06
See application file for complete search history.

(56) References Cited

U.S. PATENT DOCUMENTS

| | | |
|---|---|---|
| 1,009,213 A | 11/1911 | Augustine |
| 3,169,487 A | 2/1965 | Namikawa |
| 3,863,611 A | 2/1975 | Bakos |
| 3,909,162 A | 9/1975 | Nutku |
| 5,366,356 A | 11/1994 | Volftsun |
| 5,420,463 A * | 5/1995 | Agostino ................. F03B 3/00 290/54 |
| 6,554,596 B1 | 4/2003 | Patterson et al. |
| 6,945,218 B2 | 9/2005 | Patterson |
| 7,118,361 B2 | 10/2006 | Patterson |
| 11,952,899 B1 | 4/2024 | Dym |
| 2004/0189010 A1* | 9/2004 | Tharp ....................... F03B 3/00 290/54 |
| 2013/0088015 A1* | 4/2013 | Walton ..................... F03B 3/00 290/54 |
| 2024/0191625 A1 | 6/2024 | Dym |

OTHER PUBLICATIONS

US Office Action, U.S. Appl. No. 18/074,817, Applicant: Herbert Dym, Mail date: Aug. 22, 2023, 22 pages.

US Notice of Allowance, U.S. Appl. No. 18/074,817, Applicant: Herbert Dym, Mail date: Dec. 21, 2023, 8 pages.

US Office Action, U.S. Appl. No. 18/582,521, Applicant: Herbert Dym, Mail date: Jul. 16, 2024, 15 pages.

\* cited by examiner

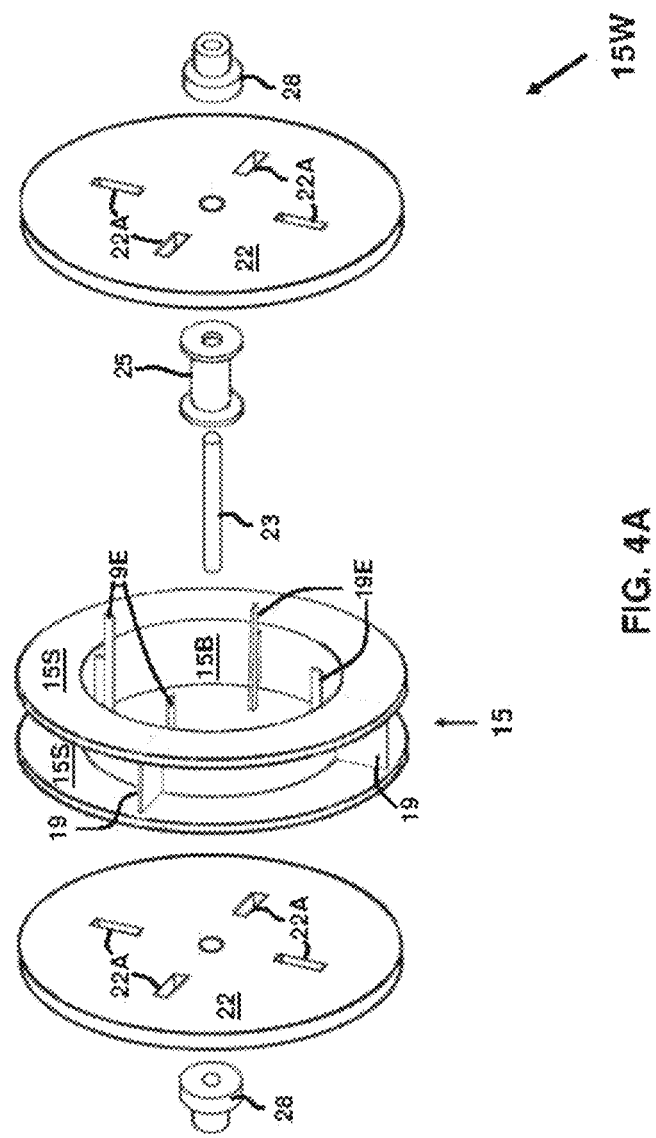

BIDIRECTIONAL ROTARY HYDRAULIC MOTOR AND PUMP

This is a divisional application of U.S. patent application Ser. No. 18,582,521, filed on Feb. 20, 2024, which is a divisional of U.S. patent application Ser. No. 18/074,817, filed on Dec. 5, 2022, both assigned to the same assignee as the present application and herein incorporated by reference in their entirety.

FIELD

This disclosure relates to bidirectional, rotary hydraulic motors and pumps with a rotary toroidal piston chamber affixed to a rotary shaft with the rotary chamber including pistons and movable gates.

BACKGROUND

In a conventional hydraulic piston machine, reciprocating pistons via mechanical linkage operate a cranking mechanism to achieve rotary motion of a drive shaft. A piston moving back and forth within a cylindrical piston chamber provides the force to operate the cranking mechanism. A problem with this structure is that the torque produced to turn the drive shaft is sinusoidal. The torque varies from zero with the piston at top dead center to its peak value at a quarter turn of the shaft and back to zero at a half turn of the shaft. One piston cannot provide a complete rotation of the shaft.

Three pistons are required to provide a complete rotation of the drive shaft. The additional pistons do not provide additional torque to increase the peak torque value. Each piston provides rotational force for one third of the shaft rotation. The resultant torque is not constant as the shaft rotates; it fluctuates reaching the peak value at a point in each third of the rotation.

Another problem with reciprocating pistons of a hydraulic motor is the flow of pressurized water into the cylindrical piston chamber is a sinusoidal in and out flow. Water under pressure flows into the chamber to provide the force for the power stroke that drives the crank. At the end of that stroke when the chamber has the maximum volume of water, the water must be expelled for the piston to return to the top to start the next stroke. Input and output ports in the cylindrical chamber require valves that operate alternately to accommodate the in and out reversal of the water flow.

Designs presented in prior art for hydraulic motors that operate without reciprocating pistons use a rotor with radially extended vanes where one vane at a time is exposed to the incoming water pressure and provides the force to turn the rotor. These machines provide continuous rotation but the designs are asymmetric and operate in only one direction. The designs also are limited to only one vane able to provide rotational torque. As the vanes rotate they move between open and closed conditions that are controlled by internal cam means which require complex interior designs.

It appears there has been no design, in the prior art, of a machine that uses a closed toroidal piston chamber with a functioning piston that can move continuously around the chamber. This may be because a fully closed chamber is incompatible with a functioning piston. A piston requires a mechanical connection to some mechanism or object outside the chamber. The mechanical connection must be able to apply force to the piston when it is operating in a pump and receive force from the piston when it is operating in a motor. The problem is that an opening is required completely around the toroidal chamber to accommodate the exterior mechanical connection to the piston that is moving around the interior of the chamber while requiring a closed chamber to contain water under pressure with a pressure tight seal.

A problem with conventional piston operated machines is that they require mechanical linkages for the piston reciprocating in a cylinder to crank and rotate a drive shaft. The present disclosure turns the drive shaft directly without a crank.

A problem with the piston reciprocating within a cylinder and its accompanying linkages is that it cannot provide force to turn a drive shaft when the piston is at top dead center in the cylinder.

A problem with a stationary toroidal piston chamber (not rotary) in which the piston is moving around the chamber is that the input and output ports have to be connected to plumbing that is fixed in position while at the same time the ports must maintain a fixed positional relationship with a moving piston. This arrangement, a stationary chamber with fixed ports, is unworkable.

A problem with a toroidal piston chamber is that it requires an opening around the chamber for the external connection to the piston. A cover to close the chamber opening must provide a pressure tight seal while allowing the piston with its external connection to move within the chamber.

SUMMARY

An object of this disclosure is a hydraulic piston machine having a rotary toroidal piston chamber in which the piston functions with continuous motion in one direction. In this disclosure the piston's motion within the chamber is relative motion while the chamber rotates and the piston is held stationary.

A further object of this disclosure is a hydraulic piston machine having a rotary toroidal piston chamber with one or more stationary pistons in which the pistons function with continuous motion and the chamber motion is continuous, with steady water flow and steady torque, and wherein the chamber motion is bidirectional for motor or pump operation.

Another object of this disclosure is a hydraulic piston machine having a rotary toroidal piston chamber with one or more stationary pistons that turn a drive shaft without a crank and mechanical linkages.

In accordance with this disclosure a rotary piston chamber hydraulic machine includes at least one stationary piston and two retractable gates for each piston within a toroidal chamber mounted on a wheel fixed to an axle on which it rotates. With multiple pistons within the chamber a partition of the interior space is formed between pistons. Each partition has an input and output port. The cross section of the toroidal chamber is a rectangle with three sides composed of a bottom and two sidewalls with an open top. The open top allows the external mechanical connection to the piston, the "piston support", to hold the piston stationary against large pressure force while the chamber rotates. The open top is closed by a stationary cover that encircles and seals the open chamber. Openings in the cover are provided for each piston support to pass through and be sealed. The cover also has openings for the input and output ports. A stationary cover that can withstand and contain water under pressure within the chamber with a pressure tight seal between the cover and the rotating chamber is an important and essential part of this disclosure.

The pressure tight seal between the stationary chamber cover and the rotating chamber is achieved through the use of a seal channel at the top of each chamber sidewall. The cylindrical cover is provided with a flange along the edge on each side. With the cover in position the flange extends into the center of the seal channel between the channel bottom and the channel cap. The space below and above the flange is filled with resilient sealing material that provides the pressure tight seal. Adhesive on the channel bottom holds the sealing material in place as the chamber rotates. A low friction film on the sealing material contact surface and a low friction coating on the cover flange provide a sliding seal with minimal friction.

Within the toroidal chamber there are radially movable gates that provide closed sections within the chamber. Each gate retracts to an open position as it passes a stationary piston which allows for unobstructed continuous rotation of the chamber. Control of the gate's open or closed position is by cam means external to the chamber. This allows the chamber interior to remain simple and symmetric which enables bidirectional operation of the machine.

Rotation of the chamber and axle/drive shaft is achieved without a cranking mechanism and its mechanical linkage. Each piston has an input and an output port, without valves, within a partition of the chamber. When the machine is operating as a motor, water under pressure enters through the input port into the closed section of the chamber formed by the stationary piston at one end and the closed gate, which is fixed in the chamber, at the other end. The force of the water pressure on the piston and the gate acts to push them apart. In this disclosure it is the chamber that moves and not the piston, which is held stationary, the reverse of the conventional piston in a cylinder. The force of water pressure on the gate provides the torque to rotate the chamber. With a steady input water flow the chamber and the axle/driveshaft will turn at constant velocity continuously and with constant torque.

Advantages of the Rotary Piston Chamber Machine

Eliminates need for cranking mechanism and its linkage
Eliminates need for valves at input and output ports
Continuous rotation of chamber with steady flow and steady torque
Efficient water use
Hoist and hold capable (holds load with no water flow)
Chamber is simpler (has no internal cams)
Bidirectional operation of hydraulic motor or pump
Multiple pistons, each with I/O ports, in one piston chamber provide:
  High Power (megawatt with large pistons & chamber diameter)
  Variety of applications and some unique functions:
    Water powered sump pump, hand cranked bilge pump
    Vehicle powered by water pressurized by compressed air
    Air compressor (done by pumped water pressure)
    Pumped energy storage (water or electric powered to elevated water reservoir or deep water compressed air)
    Hydroelectric power (where turbines may or may not go)
      Energy harvesting (wind farm, many mills pump water to one hydroelectric generator)

Also in accordance with the objects of this disclosure, a hydraulic device is achieved comprising a rotatable toroidal piston chamber mounted on a chamber wheel affixed to an axle, an external frame supporting the axle. At least two stationary pistons within the piston chamber are held in fixed positions by external support means attached to the external frame. At least four gates within the piston chamber rotate with the chamber and when closed transmit fluid pressure forces to the chamber wheel. The pistons and gates are evenly spaced around the toroidal chamber separating the chamber into partitions, one partition for each piston The gates are adapted to be opened and closed by gate control means. A stationary cover for the chamber closes and seals the opening around the piston chamber with openings in the cover for the at least two stationary pistons and fluid input ports and output ports on each side of each of the partitions.

Also in accordance with the objects of this disclosure, a hydraulic device is achieved comprising a rotary toroidal piston chamber having a rectangular space with a bottom, two sidewalls, and an open top. At least one stationary piston and two retractable gates for each piston are within the toroidal chamber mounted on a chamber wheel fixed to an axle on which it rotates. A piston support for each piston is configured to hold the piston stationary while the piston chamber rotates. The pistons and gates are evenly spaced around the toroidal chamber separating the chamber into partitions, one partition for each piston. A stationary cover encircles and seals the open top of the piston chamber wherein openings through the stationary cover allow each of the piston supports to pass through and be sealed. An input port opening and an output port opening are in the stationary cover for each partition. The piston chamber rotates by reacting directly to continuous hydraulic force on the stationary piston.

Also in accordance with the objects of this disclosure, a hydraulic device is achieved comprising a rotary toroidal piston chamber having a rectangular space with a bottom, two sidewalls, and an open top. Four stationary pistons and two retractable gates for each piston are within the toroidal chamber mounted on a chamber wheel fixed to an axle on which it rotates, wherein the pistons and the gates are evenly spaced around the toroidal chamber separating the chamber into four partitions. A piston support for each piston is configured to hold the piston stationary while the piston chamber rotates. A stationary cover encircles and seals the open top of the piston chamber wherein openings through the stationary cover allow each of the piston supports to pass through and be sealed. An input port opening and an output port opening are in the stationary cover for each partition. The piston chamber rotates by reacting directly to continuous hydraulic force on the stationary pistons.

BRIEF DESCRIPTION OF THE DRAWINGS

FIG. 4A is an exploded perspective view of the components comprising the chamber wheel.

DETAILED DESCRIPTION

Figure 1A:
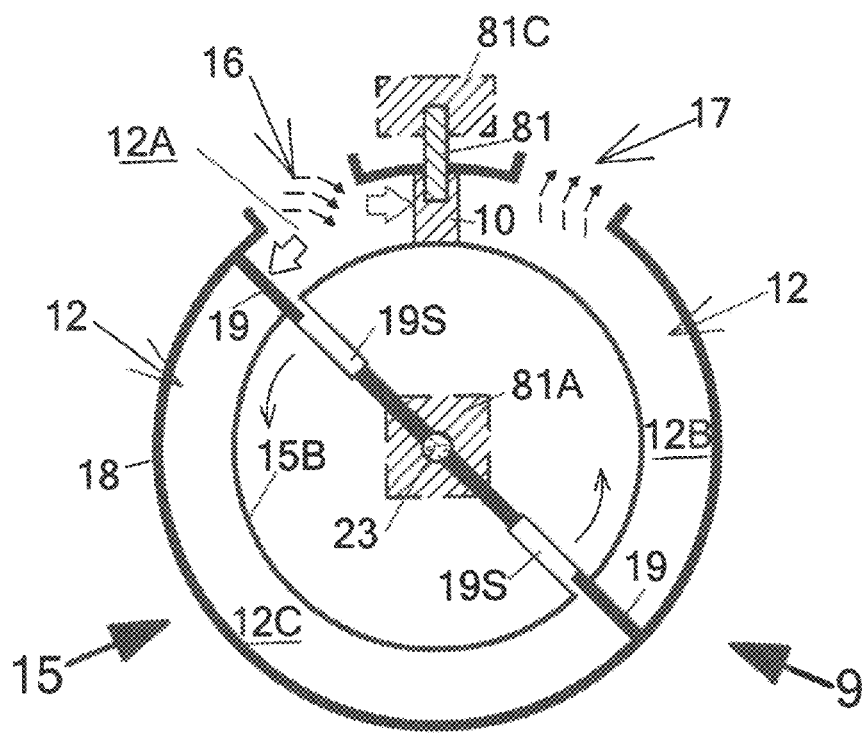
FIG. 1A is a schematic drawing to explain the principle and function of the rotary piston chamber with one stationary piston.

FIG. 1A is a schematic drawing provided for illustrating the principle and function of the rotary piston chamber with one stationary piston operating in a hydraulic machine 9 with a rotary chamber 15 fastened to an axle 23 on which it rotates. The chamber 15 defines a space 12 within which is a stationary piston 10.

The components operate together in a manner quite different from traditional reciprocating piston machines in which a piston reciprocates back and forth within a fixed position cylinder to operate a cranking mechanism which provides rotary motion. In accordance with this disclosure, the stationary piston 10 is housed within a toroidal rotary chamber 15 which rotates by reacting directly to continuous hydraulic force on the stationary piston 10, thereby eliminating the cranking mechanism of traditional machines with reciprocating pistons in cylinders.

Figure 2:
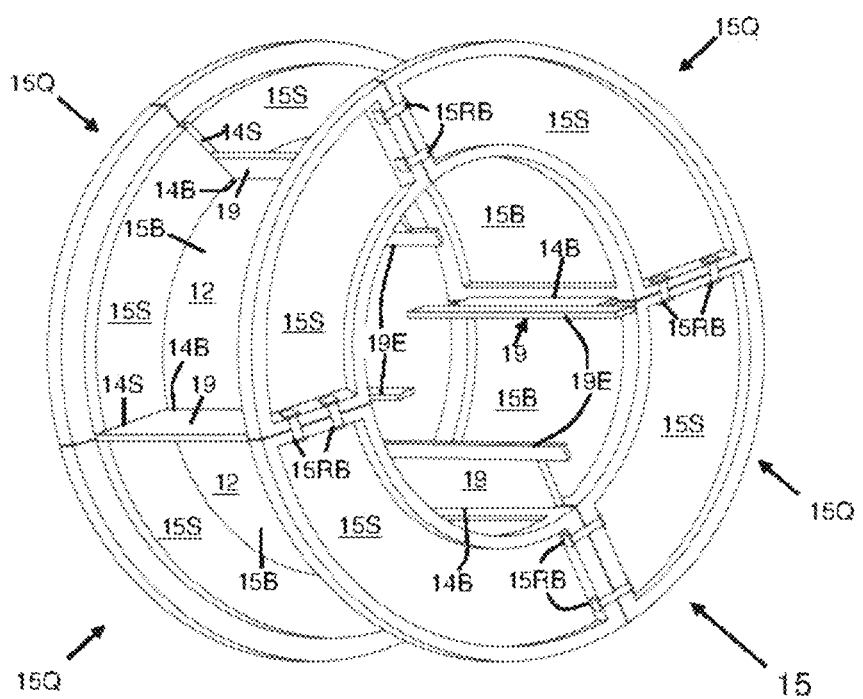
FIG. 2 is a perspective view of the rotary piston chamber assembly comprised of four segments of the rotary chamber.
Figure 3:
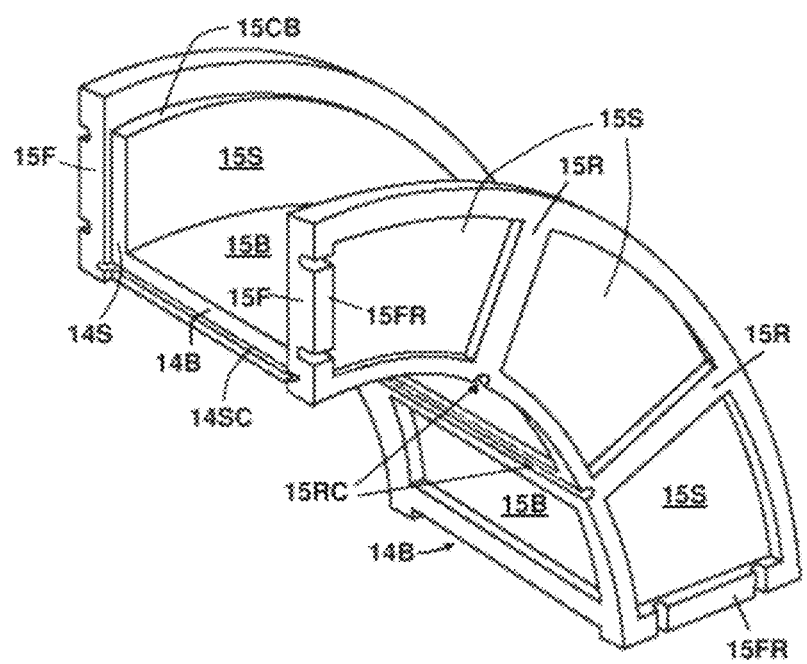
FIG. 3 is a perspective view of one segment of the chamber assembly of FIG. 2, showing a chamber quadrant.

The cross section of the rotating chamber 15 is an open rectangle consisting of the chamber bottom 15B and two chamber sidewalls 15S shown in both FIG. 2 and FIG. 3. The open top of the rotating chamber 15 is closed and completely encircled by a stationary cover 18 which defines the top of an enclosed space 12 within the chamber 15. The cover 18 has an opening for the piston support 81 to pass through where the cover 18 is fixed and sealed to the piston 10. The stationary chamber cover 18 does not move but is designed to maintain a pressure tight seal with the rotating chamber 15 while the chamber 15 is rotating. An input port 16 and an output port 17 are openings located in the chamber cover 18 on either side of the piston 10 as shown in detail in FIG. 15.

In operation the piston 10 functions as a movable end of a closed section 12A or 12B within the rotating chamber 15. Relative motion of the stationary piston 10 with respect to the rotating chamber 15 results in either an expanding or contracting volume of the closed section 12A or 12B. The fixed end of each closed section 12A or 12B within the chamber 15 is formed by one of a plurality of gates 19 each of which is radially moveable in and out of the chamber 15 by sliding into and out of place through respective slots 14B in the chamber bottom 15B. Each gate 19 is held in place by slots 14S in the chamber sidewalls 15S of the rotating chamber 15 as shown in FIGS. 2 and 3. When water under pressure enters the closed section 12A it acts to expand the closed section 12A causing the chamber 15 to rotate. The force of water pressure on a closed gate 19 is transmitted through force on each of the slots 14S in the chamber sidewalls 15S of the chamber 15 and the slot 14B in the chamber bottom 15B to the chamber 15 structure and from there as torque on the axle-drive shaft 23. When the position of the gate 19 in the rotating chamber 15 approaches the stationary piston 10 the gate 19 is opened by withdrawing the gate 19 back inwardly through the slot 14B in the chamber bottom 15B to a space 19S outside the chamber 15, leaving an unobstructed opening for the gate 19 to pass the stationary piston 10.

In FIG. 1A arrows show the direction of the water flow and forces when the hydraulic machine 9 is operating as a motor. Water under pressure enters the closed input section 12A of the interior space 12 through the input port 16 which causes an equal force to be applied to the piston 10 and the closed gate 19. This results in a counter clockwise torque on the axle 23. If that torque is greater than the resisting torque of a load on the axle 23, then the chamber 15 and the axle 23 will rotate. Two gates 19, which are shown diametrically opposed, are used so there is always at least one gate 19 closed. This allows steady torque and continuous rotation while the open gate 19 passes the position of the stationary piston 10. After the open gate 19 passes the stationary piston 10, that gate 19 closes and once past the input port 16 that gate 19 again becomes an active gate 19 that applies the force that rotates the chamber 15. The water in the section 12C of interior space 12 between the two closed gates 19 is swept along until the first gate 19 reaches the output port 17.

At that point the water is discharged through the output port 17 and the first gate 19 opens before arriving at the stationary piston 10.

The output torque on the axle-drive shaft 23 is proportional to the input water pressure. The efficiency of converting the potential energy of the input water to work at the output shaft in principle is very high. The energy losses are through the friction of the rotating chamber 15 with its cover 18 and the stationary piston 10 and losses of flowing water and turbulence at the input port 16. Those can be designed to be minimal. The output torque, unlike a turbine, is at maximum torque when the output drive shaft 23 is stationary and there is no water flow and thus no energy used. With constant water pressure as input flow rate increases, the high torque is maintained as the rotation rate increases. This operating property, when operating as a hydraulic motor, allows the hydraulic motor to be used to hoist and hold heavy loads or to drive an electric generator with high efficiency of water usage.

The symmetrical design allows a reversal of the motor operation. This is accomplished by reversing the function of the input and output ports 16/17. If the water under pressure enters what had been the output port 17, the torque and rotation of chamber 15 will be in the clockwise direction. When the hydraulic machine 9 is operating as a motor the axle-drive shaft 23 of the hydraulic machine 9 functions as an output drive shaft that can drive an external load.

The axle-drive shaft 23 can also function as an input drive shaft with the hydraulic machine 9 operating as a pump. An external counter clockwise torque applied to the axle-drive shaft 23 will rotate the chamber 15 counter clockwise. With rotation in this direction the closed section 12A of the interior space 12 at the input port 16 is an expanding volume that will draw available water into the space 12. The closed section 12B of the interior space 12 at the output port 17 is a contracting volume. The input torque applies a force to the gate 19 through the slots in the chamber sidewalls 15S and the chamber bottom 15B, which puts the water in that section 12B under pressure. If that pressure is greater than the external pressure at the output port 17, then the rotary chamber 15 will rotate and water will be discharged. The symmetrical design also allows the machine 9 to operate as a pump in either direction.

When the hydraulic machine 9 is employed to pump water, the mechanical energy input at the axle-drive shaft 23 can pump water to an elevated level to store it as potential energy, the function is accomplished with high efficiency. As it is when operating as a motor, the energy losses due to friction, water flow and turbulence can be minimal. This would make it practical, for example, for a windmill to operate a rotary chamber machine 9 to pump water to an elevated reservoir to store the harvested wind energy. The pumped water from many windmills can be accumulated and used to operate one large rotary hydraulic machine 9 as a motor to drive one electric generator.

Other considerations in this design are the forces of the pressurized water other than those on the piston 10 and gate 19. There are large forces on the chamber cover 18, the chamber sidewalls 15S, and the chamber bottom 15B. The area of the chamber cover 18 exposed to the pressure is much larger than that of the gate 19, so the outward radial force on the chamber cover 18 will be much larger than the tangential force on the gate 19. The magnitude of the force varies as the gate 19 moves and the size of the section under pressure changes. This force is unbalanced and would require strong external support to keep the chamber cover 18 in position. The inward radial force on the chamber bottom 15B acts as a heavy weight on the axle 23.

Figure 1B:
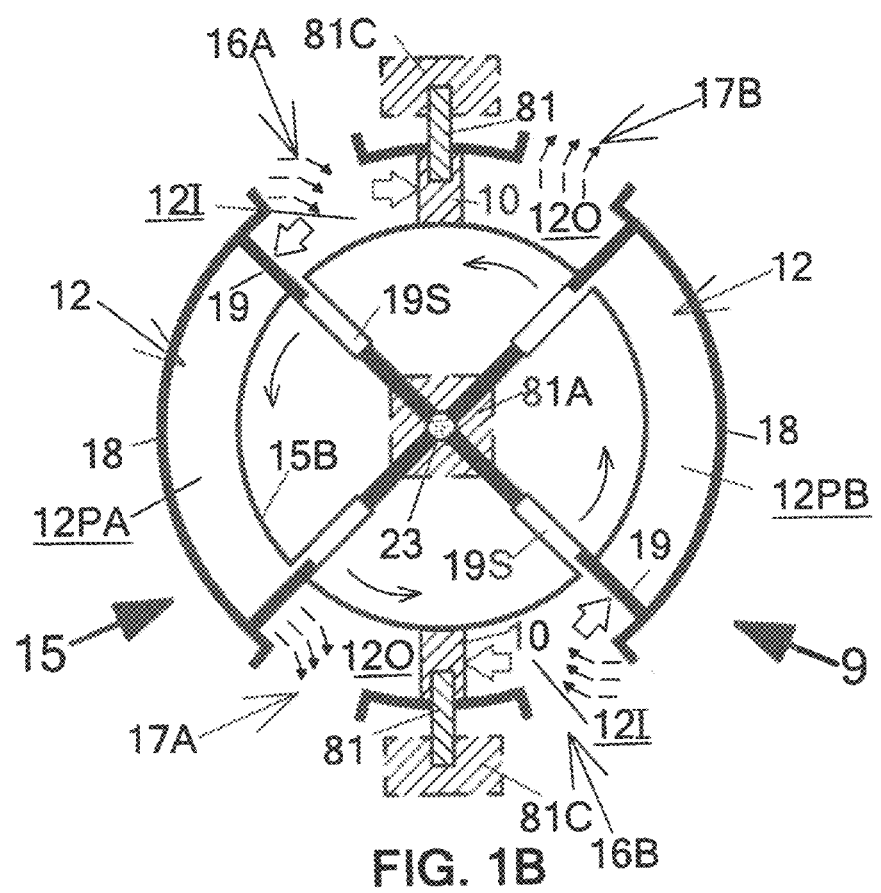
FIG. 1B is a schematic drawing of the rotary piston chamber with two stationary pistons.

FIG. 1B is a schematic drawing of the rotary piston chamber 15 with two stationary pistons 10 dividing the interior space 12 into two partitions 12PA and 12PB between the two pistons 10, input ports 16A and 16B, output ports 17A and 17B and four gates 19. This is the preferred configuration and has two significant improvements over the single stationary piston version shown in FIG. 1A. First, with two pistons 10 and two of the four gates 19 under pressure at any time the torque on the axle 23 is doubled. Second, the radial forces produced by the water pressure are balanced. Any radial force exerted on the chamber cover 18 or chamber bottom 15B is matched by an equal diametrically opposed force. The result is the net force produced by water pressure is pure torque. The chamber cover 18 does not need external support to hold it in position. The axle bearings 82 for axle 23 do not need to be designed to support a large weight.

For each of the partitions 12PA or 12PB formed in the toroidal interior space 12 of chamber 15 by the two pistons 10 there is an input port 16A or 16B and an output port 17A or 17B. In operation the two input ports 16A and 16B are to be connected to the same water source through external plumbing and act as one input. Similarly, the two output ports 17A and 17B are to be connected together and act as one output. Each partition operates as described in FIG. 1A for the single piston 10. Input sections 121 and output sections 120 in FIG. 1B correspond to FIG. 1A sections 12A and 12B respectively. For a given rotation rate of the chamber 15 each partition has the same water flow rate as that of the single piston 10. Therefore, the total flow rate from input to output is double the amount for a single piston 10.

FIG. 2 shows a complete assembled chamber 15 with four gates 19 in place. Each gate 19 may have a reinforced gate tip cap 19C, shown in both FIG. 7A and FIG. 7B, that is thicker than the body of the gate 19 that would not be able to be inserted through a chamber bottom slot 14B of an assembled chamber.

The chamber 15 is assembled from segments 15Q, shown in FIG. 3, that are joined and each segment 15Q has half the slots 14S and 14B at the joint. This also allows sealing material to be inserted in the gate seal channel 14SC of each segment 15Q. When the segments 15Q are fastened together with the gate 19 in place there is no control yet of the position of the gate 19. The gate can slide freely in and out in the chamber slots 14S.

FIG. 3 is a perspective view of one segment of the chamber assembly of FIG. 2, showing a chamber quadrant 15Q. The chamber quadrant 15Q is one of four quadrants that are bolted together to form the complete chamber 15. The quadrant face 15F at each end is identical and when the quadrants are joined, they form the gate slots 14B in the bottom 15B of the chamber 15 and slots 14S in the sides 15S of the chamber 15. Integral ribs 15R provide strength to resist deformation by the internal water pressure. The gate seal channel 14SC in the bottom slot 14B holds resilient sealing material against the sides and edges of the gate to prevent leakage.

FIG. 4A is an exploded perspective view of the components comprising the chamber wheel 15W. In the assembled chamber wheel 15W the chamber 15, with four gates 19 and their four respective gate extension arms 19E installed, is centered, mounted and clamped between the two wheel discs 22. Access openings 22A in the wheel discs 22 allow the gate extension 19E to protrude through for access by the gate control means explained in detail below.

When the stationary pistons 10 and chamber cover 18 thereover are in place they are held rigidly fixed and must maintain an exact position relative to the rotating chamber 15. This requires the chamber 15 mounted on the chamber wheel 15W to have minimal wobble. The wobble would appear to the stationary piston 10 as side to side motion of the walls as the chamber 15 rotates. Also the chamber 15 must be precisely centered on the chamber wheel 15W. Any amount off center location, or eccentricity, would appear to the stationary piston 10 as up and down motion of the chamber bottom 15B as the chamber 15 rotates. The design of the chamber wheel 15W, described in detail below, is able to meet these requirements.

Figure 4B:
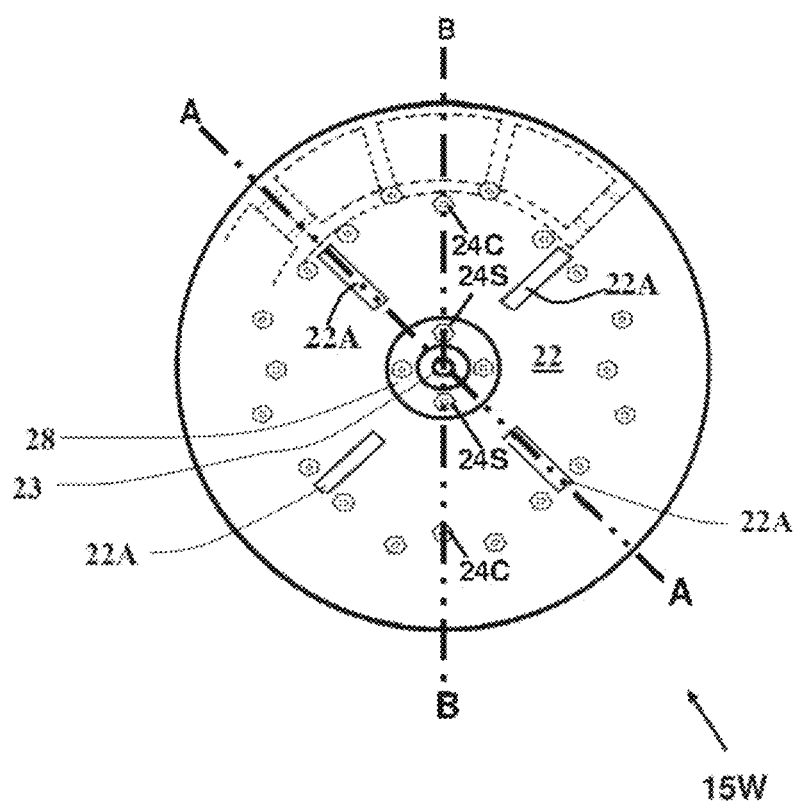
FIG. 4B is a profile view of the chamber wheel assembly with section lines to show the location of the cross sectional views.

FIG. 4B is a profile view of the chamber wheel assembly with section lines to show the location of the cross sectional views. Section line AA and section line BB show the location of the cross sectional views in FIG. 5 and FIG. 6 respectively. Clamping rods 24C and 24S are described in detail below with reference to. FIG. 6.

Figure 5:
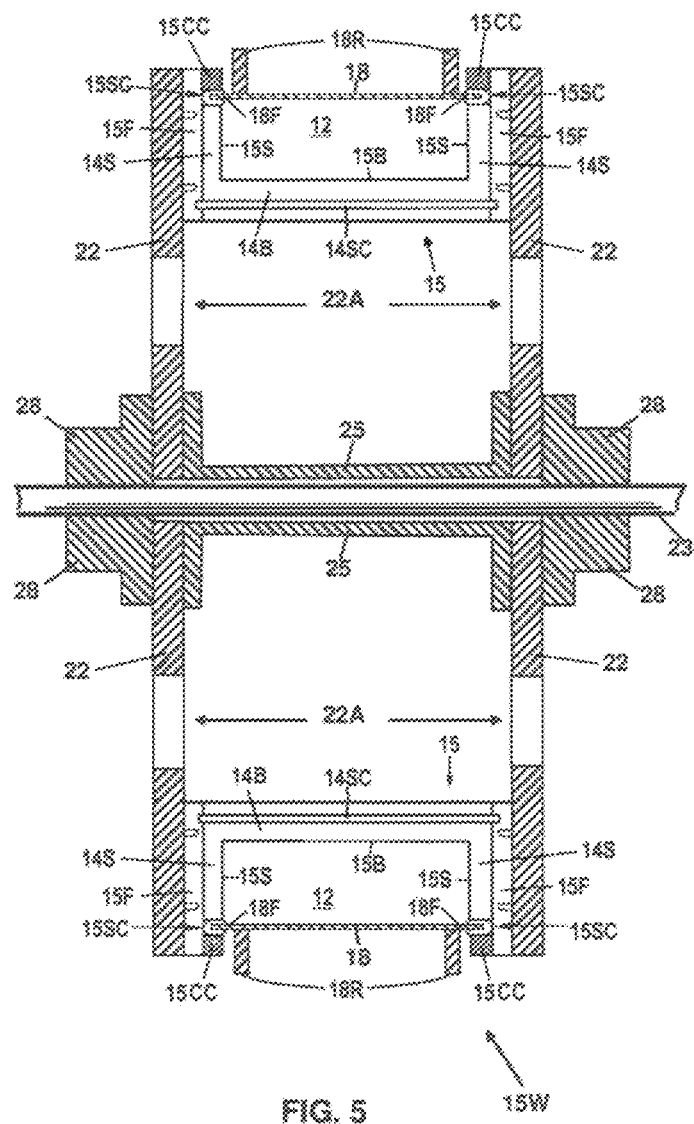
FIG. 5 is a cross sectional view of the chamber wheel assembly at the face of a chamber quadrant of FIG. 3.
Figure 6:
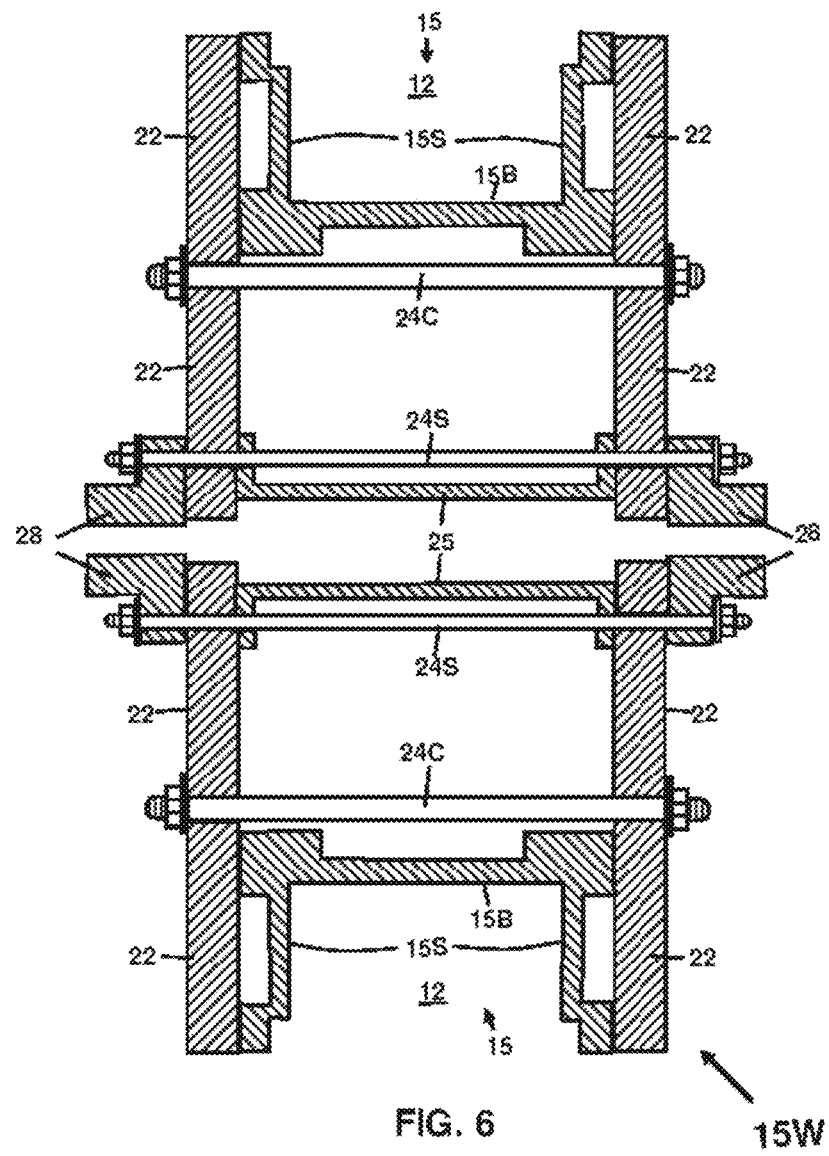
FIG. 6 is a cross sectional view of the chamber wheel assembly at a position of the clamping rods.

FIG. 5 is a cross sectional view taken along section line AA of FIG. 4B showing the chamber wheel 15W assembly at the face 15F of a chamber quadrant 15Q of FIG. 3. A hub 28 is mounted and precisely centered on each of the two wheel discs 22. A pair of wheel discs 22 is attached to the chamber 15 with one on each side. The wheel discs 22 are aligned so the gate extension 19E of each of the four gates 19 passes through a corresponding one of the four access openings 22A. The diameter of the wheel discs 22 and the outer diameter of the chamber 15 are the same. The wheel discs 22 are attached so their edges match the chamber 15 completely around the periphery, thereby assuring the chamber 15 is centered. With the wheel discs 22 attached this way on both sides of the chamber 15, it assures the axle 23 mounted through the wheel hubs 28 is exactly perpendicular to the chamber wheel 15W, which eliminates wobble thereof.

The axle 23 is fixed in the wheel hubs 28 by means such as pins or splines (not shown for convenience of illustration) so it can transmit the maximum torque expected to an external load. The spacer tube 25, which is the same width as the chamber 15, is clamped between the wheel discs 22. This provides chamber wheel 15W rigidity to reduce the tendency for the chamber walls 15S to be spread apart by the internal water pressure. The cylindrical cover 18 is shown in place at the top of the side walls 15S of the chamber 15 with cover ribs 18R which retain the cylindrical shape of the cover 18 when it is under great internal hydraulic pressure.

The strength to hold the chamber sidewalls 15S from being spread by the large force of internal pressure is obtained by using threaded clamping rods 24C to clamp the wheel discs 22 against the sides of the chamber 15.

FIG. 6 is a cross sectional view taken along section line BB of FIG. 4B of the chamber wheel assembly 15W showing the chamber clamping rods 24C and the spacer clamping rods 24S. The chamber clamping rods 24C are spaced below bottom 15B of the chamber 15. Some of the clamping rods 24C are positioned in rod channel 15RC shown in FIG. 3 where they provide a strong mechanical means for transmitting torque between the chamber 15 and the wheel disc 22.

The opening and closing of each gate inside the chamber 15 as the chamber rotates is controlled by a control means outside the chamber wheel 15W. Such control means may be a cam mechanism which can be mounted to the frame side 81A or to the piston support 81. The cam mechanism can be a cam track 32 shown in FIG. 8A and FIG. 8B that controls both the inward and outward movement of the gate or a single surface cam with a spring. Alternatively, the control means may be a gear operated mechanical linkage which would allow higher rotary speeds and larger heavy gates.

Figure 7A:
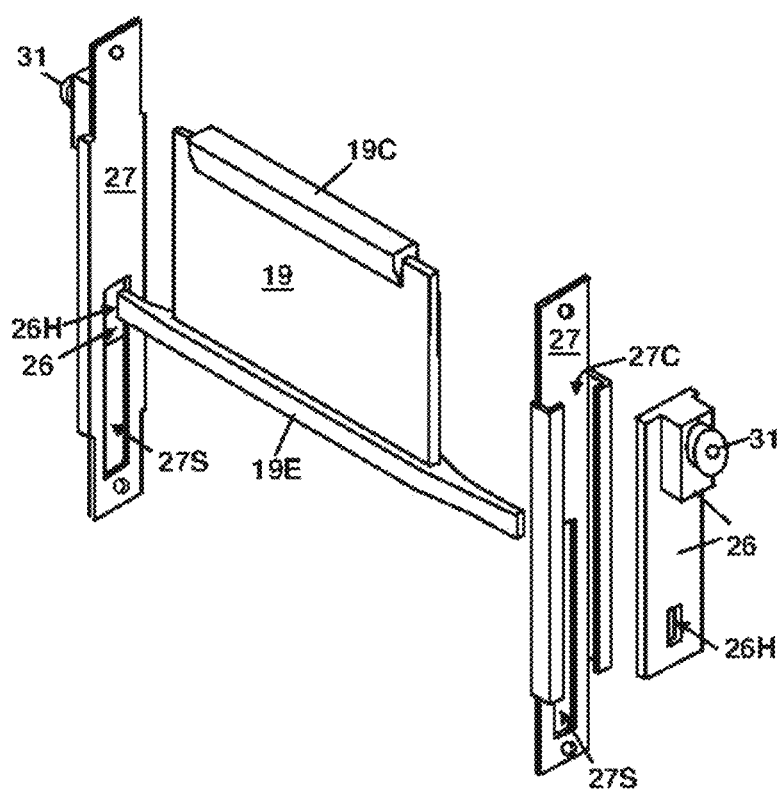
FIG. 7A is an exploded perspective view of a gate and the gate control.

FIG. 7A is an exploded perspective view of a gate 19 and the gate control which shows the gate 19 with gate extension arm 19E shown in FIGS. 2 and 4A and the gate position control means comprising a guide 27 and cam follower wheel 31 mounted on a push-pull bar 26 which slides up and down in channel 27C on guide 27. When the gate 19 is in the closed position it is fully extended through the chamber bottom slot 14B into the interior space 12 with the gate tip cap 19C provided to be in contact with the chamber cover 18. The radial length of the gate 19 is long enough so part of it, comprising the gate extension arm 19E, extends outside the chamber bottom 15B when in the closed position.

Referring to FIG. 4A, the gate extension arm 19E protrudes sideways through the access opening 22A in the wheel discs 22 on both sides of the chamber wheel 15W. The gate extension arm 19E is inserted through slot 27S and into hole 26H in the push-pull bar 26 which slides up and down in the guide 27 which is attached to the wheel disc 22 over the access opening 22A thereby sliding the gate 19 in and out of chamber 15.

Figure 8A:
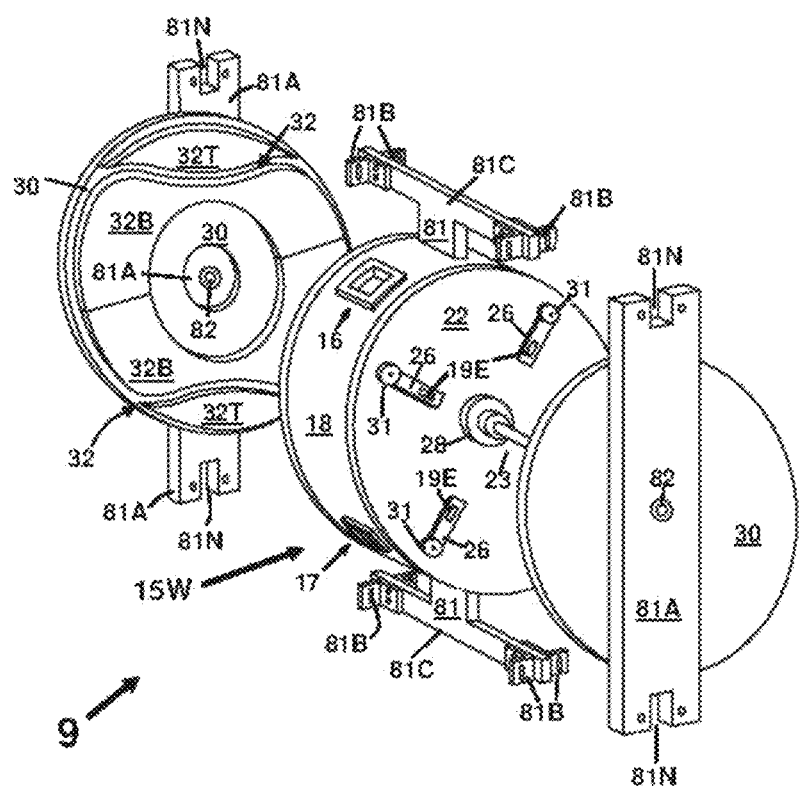
FIG. 8A is a partially exploded perspective view of the components of the complete machine comprised of the assembled chamber wheel showing the external gate control cam follower and stationary cam track and the frame with the piston support and the axle bearing.
Figure 8B:
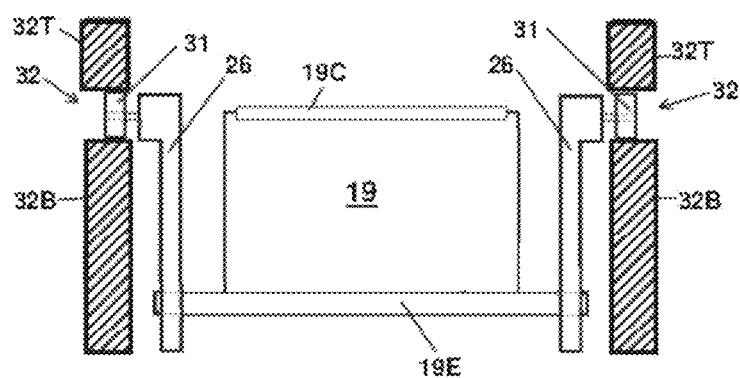
FIG. 8B is a front view of a gate and the gate position control components.

Referring to FIGS. 8A and 8B a cam follower wheel 31, shown in the cross section in FIG. 8B, is mounted in the top of push pull bar 26 and is adapted to ride in a cam track 32 mounted on a cam plate 30. The cam follower wheels 31 on both sides of the chamber wheel 15W control the up and down motion of the gate extension arm 19E thereby controlling the position of the gate 19.

Figure 7B:
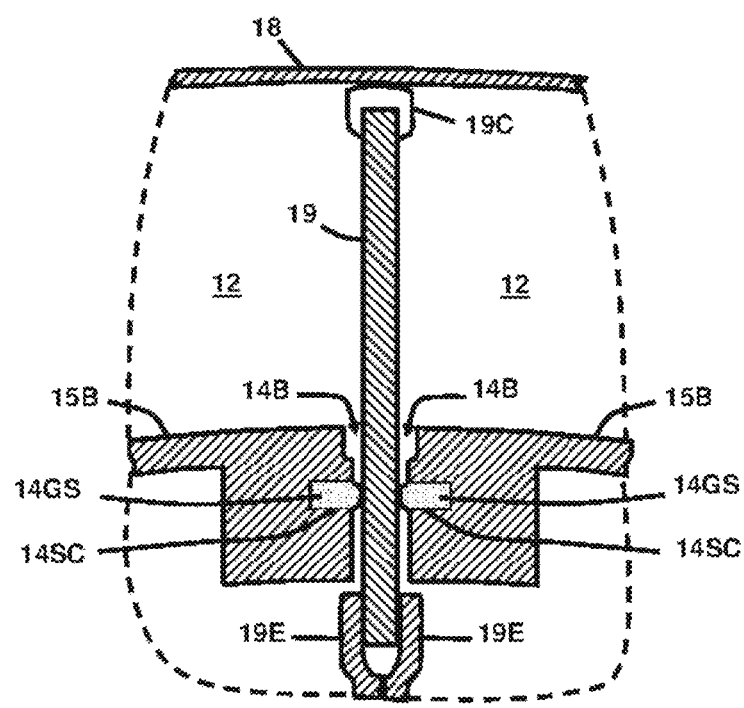
FIG. 7B is a cross sectional view of an extended closed gate and the bottom slot with the gate seal.

FIG. 7B is a cross sectional view of an extended closed gate 19 and the bottom slot 14B with the gate seal material 14GS in the gate seal channel 14SC in the chamber bottom slot 14B. The gate 19 is shown in the closed position with the gate tip cap 19C in contact with the cover 18. Water leaking past the sliding gate tip cap 19C would not affect the hydraulic machine 9 function, but would result in a reduction in efficiency of water usage. The gate tip cap 19C can be designed to reinforce and stiffen the unsupported edge of the gate 19 to resist the deformation by the force of water pressure. The top of the gate tip cap 19C has the same curvature as the chamber bottom 15B. When the gate 19 is retracted to the open position, the gate tip cap 19C is flush with the chamber bottom 15B. This allows the piston 10 to slide over the bottom slot 14B smoothly. The gate seal channel 14SC is filled with resilient sealing material 14GS that is in pressure contact with the gate 19 to form the seal.

FIG. 8A is an exploded perspective view of the complete hydraulic machine 9 showing the external frame comprised of two frame sides 81A that hold the axle bearings 82 for axle 23 of the chamber wheel 15W and two frame ends 81C each with integral piston support 81, the assembled chamber wheel 15W of FIG. 5 (cover ribs 18R not shown for convenience of illustration) with external gate control cam followers 31 mounted on the chamber wheel 15W and a stationary cam track 32 mounted on a cam plate 30 attached to frame side 81A. Four brackets 81B bolted to each frame end 81C provide the attachment means for the frame sides 81A thereby providing the correct spacing between the two frame sides 81A and enabling the required positioning in the assembled frame of the axle bearings 82 and the piston support 81. Frame ends 81C fit into notches 81N in frame sides 81A. The external piston support 81 holds the stationary piston 10 in a fixed position in the interior space 12. As an integral part of the frame the piston support 81 has the structural strength to hold the stationary piston 10 in a fixed position against the same force the water pressure applies to the gates 19.

FIG. 8B is a cross sectional view of a gate 19 and the gate position control components shown in FIG. 8A with the cam follower wheel 31 shown in its operating position in the cam track 32. The cam track 32 is formed by cam track top 32T and cam track bottom 32B which are mounted on cam plate 30. As the chamber wheel 15W shown in FIG. 8A rotates, the cam follower wheels 31 ride along the stationary cam tracks 32 between the cam track top 32T and cam track bottom 32B and are driven radially inward and outward by the cam track 32 to push or pull the gate extension 19E with the push-pull bar 26. The push-pull bar 26 applies a force to the gate extension 19E through springs (not shown) as will be well understood by those skilled in the art of mechanical design. When the gate 19 is closed, the spring force pushes the gate tip cap 19C into sliding contact with the stationary cover 18 shown in FIG. 7B, which is maintained with controlled force. The contact is released when the gate 19 is opened by return motion of the push-pull bar 26.

Figure 9:
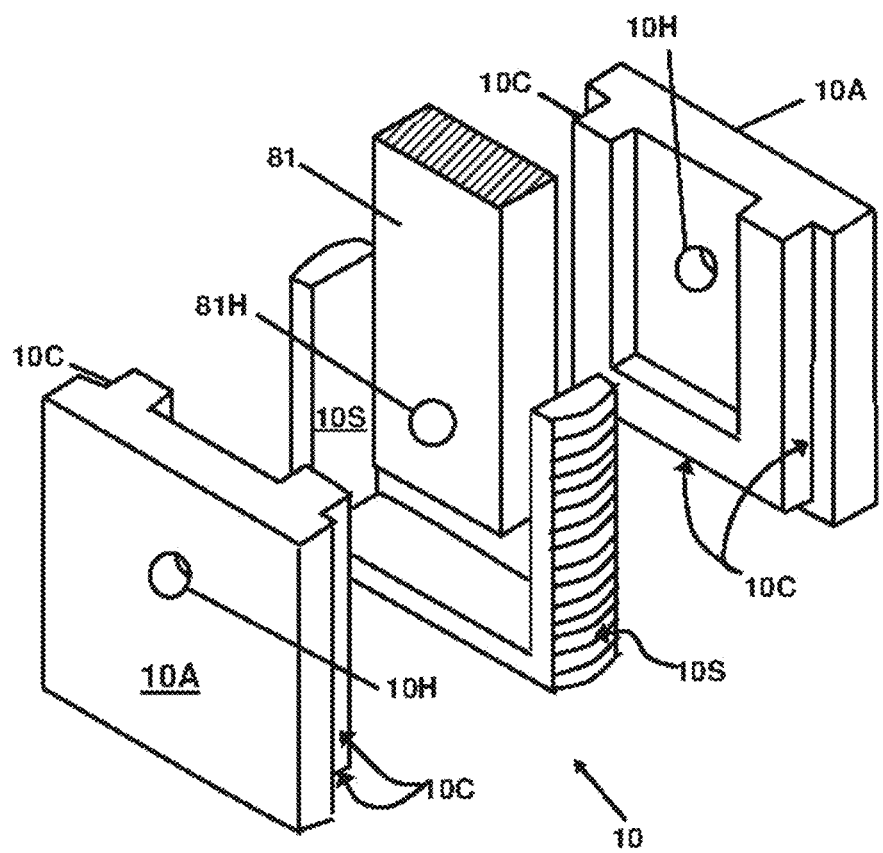
FIG. 9 is an exploded perspective view of the piston with the piston support.

FIG. 9 is an exploded perspective view showing parts of the piston 10 plus the piston support 81. When the two halves 10A of the piston 10 and piston support 81 are bolted together by bolt 13B shown in FIG. 13 through holes 10H in the two halves 10A and the hole 81H in the piston support 81; a piston seal channel 10C is formed around the lateral and bottom edges of the piston 10. The sliding piston seal 10S is comprised of a resilient material molded to fit and fill in the piston seal channel 10C. The seal 10S provides a sliding seal between the piston 10 and the chamber 15 side walls 15S and bottom 15B and its contact surface is shaped to maintain that seal as the piston 10 slides over the gate slot 14S.

Figure 10:
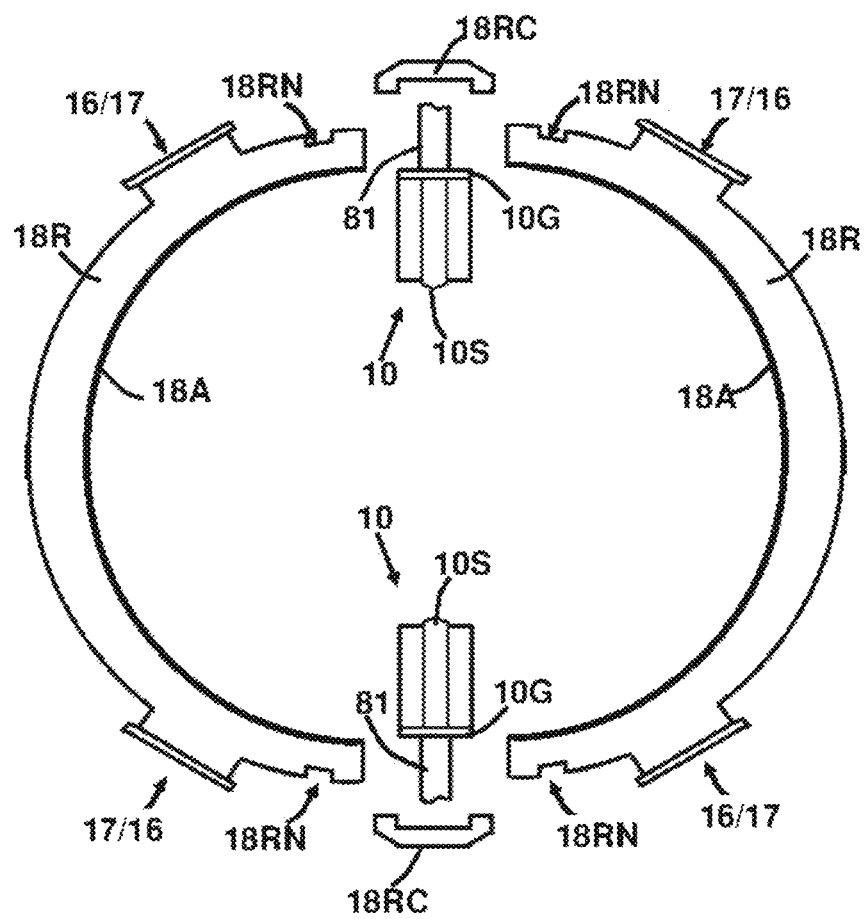
FIG. 10 is a profile view of the stationary chamber cover halves and the piston components to which it is attached when the cover is assembled.

FIG. 10 is an exploded profile view of the chamber cover 18 comprised of the two cover halves 18A and the pistons 10 with gasket 10G and piston support 81 to which they are attached and sealed when the cover 18 is assembled. The open top of the toroidal rotary piston chamber 15 is closed by the stationary cover 18 that must maintain a pressure tight seal while allowing the chamber to rotate with minimal resistance. Each cover half 18A includes input/output ports 16/17 and cover ribs 18R for cover 18. Rib clamps 18RC are provided to fit into rib notches 18RN to hold cover halves 18A together against the outward radial force or water pressure. The clamped ribs 18R encircling the cylindrical chamber cover 18 are designed to provide rigidity and strength to maintain the circular profile required for the cover flange seal 18FS of the rotating chamber 15 shown in FIG. 14.

Figure 11:
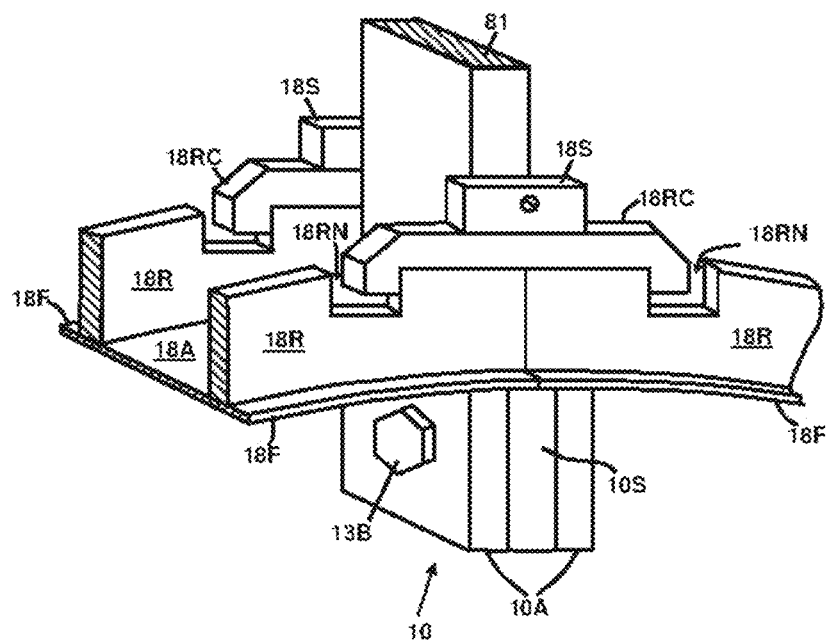
FIG. 11 is a perspective view of the chamber cover joint where it is assembled and attached to the stationary piston.

FIG. 11 is a perspective view of the chamber cover 18 where it is assembled and attached to the piston 10 and shows the two cover halves 18A of FIG. 10 are joined at the piston 10 to form the cylindrical cover 18. The adjacent ends of the cover halves 18A are held together by the two rib clamps 18RC with projections into notches 18RN at the ends of the ribs 18R. The rib clamps 18RC provide a strong grip to hold the cover halves 18A together against the tangential component of the hydraulic force tending to pull the cover halves 18A apart. A stay 18S, attached to piston support 81, holds the rib clamps 18RC down against the ends of ribs 18R thereby helping to maintain the pressure tight seal between the piston 10 and the cover 18 shown in FIGS. 12 and 13 against the outward radial component of the hydraulic force.

Figure 12:
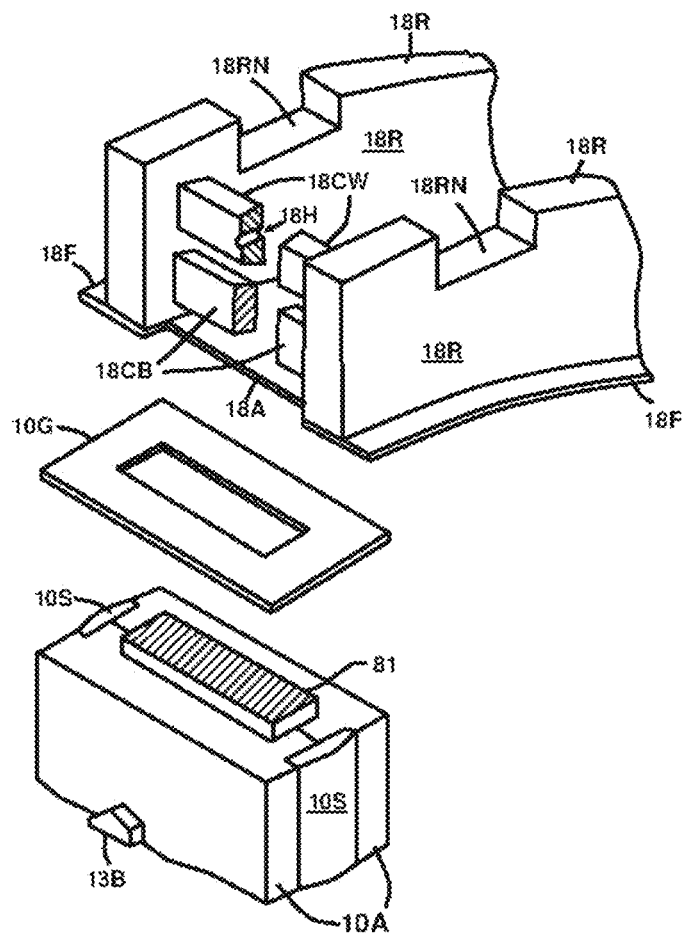
FIG. 12 is an exploded perspective view of the seal between the chamber cover and the stationary piston.

FIG. 12 Is an exploded perspective view of the chamber cover seal at the joint between the two cover halves 18A showing the components that provide the pressure tight seal between the cover 18 and the piston 10 which is achieved by clamping a gasket 10G between the cover 18 and piston 10. The strong clamping force required to contain the high pressure against the cover 18 is provided by clamp bar 18CB and clamp wedge 18CW shown in a cross-sectional view in FIG. 13.

Figure 13:
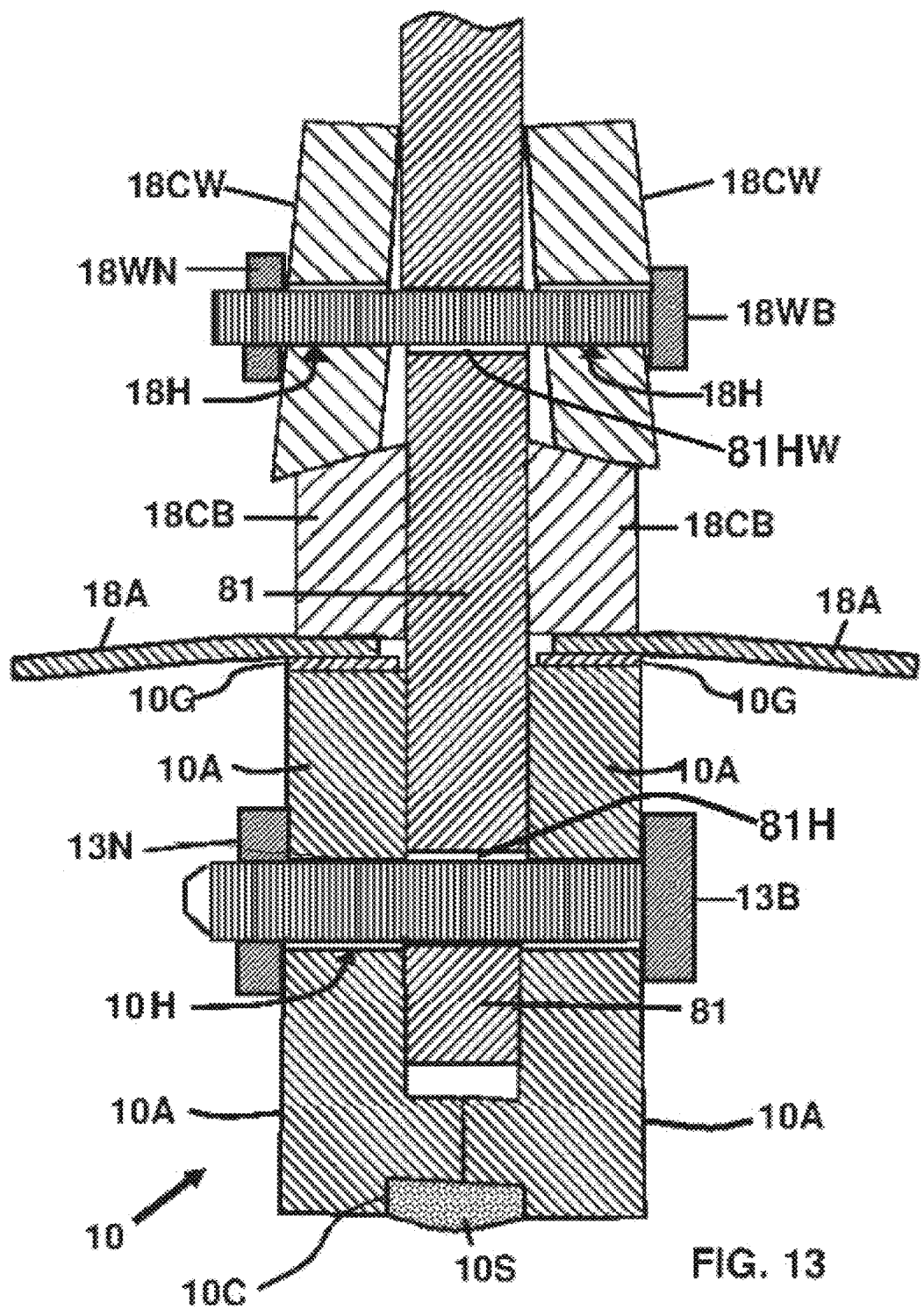
FIG. 13 is a cross sectional view of the chamber cover seal of FIG. 12 showing the assembled cover clamp wedge.

FIG. 13 is a cross section of the joint of FIG. 12 between the two cover halves 18A showing the cover 18 clamped to the piston 10 which provides a pressure tight seal. The cover clamp bar 18CB on either side of piston support 81 is pressed tightly against each of the two cover halves 18A by the clamp wedges 18CW. Tightening the wedge bolt 18WB forces the sloped mating surfaces of clamp wedge 18CW and clamp bar 18CB together to produce the strong downward clamping force on wedge bolt 18WB and bolt hole 18H in clamp wedge 18CW, provided by bolt hole 81HW in piston support 81, against the cover 18. The pressure of the clamped cover 18 against the gasket 10G produces the seal to prevent high pressure water under the cover 18 from leaking out through the opening in the cover for the piston support 81.

Figure 14:
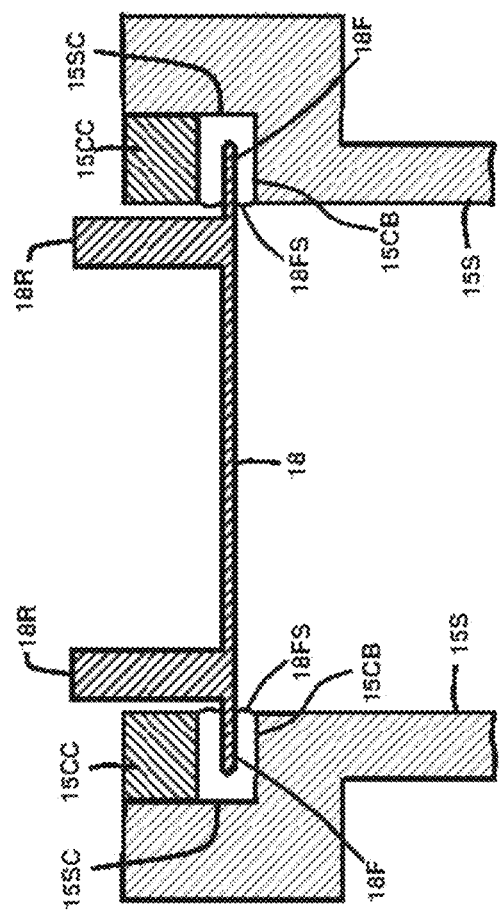
FIG. 14 is a cross sectional view of the seal between the stationary chamber cover and the rotary chamber at the cover flange.

FIG. 14 is a cross sectional view showing a pressure tight seal between the stationary cover 18 and the rotating chamber 15 which is achieved without contact or pressure forces transmitted between the cover 18 and the chamber 15. The outer edge of the cover 18 is the cover flange 18F shown extending into the cover seal channel 15SC at the top of each chamber side wall 15S. The diameter of the circular cover flange 18F, rigidly held by the cover rib 18R, places it in the center of the cover seal channel 18SC. The space on either side of the cover flange 18F between the channel base 15CB and channel cap 15CC is filled with sealing material 18FS that creates a seal between the cover 18 and the chamber 15. The sealing material 18FS is compressible and resilient with a smooth low friction surface film in contact with the cover flange 18F. The cover flange 18F has a low friction coating to keep the sliding friction between the cover flange 18F and sealing material 18FS to a minimum. Adhesive on the sealing material 18FS in contact with the channel base 15CB keeps the sealing material 18FS in place.

Figure 15:
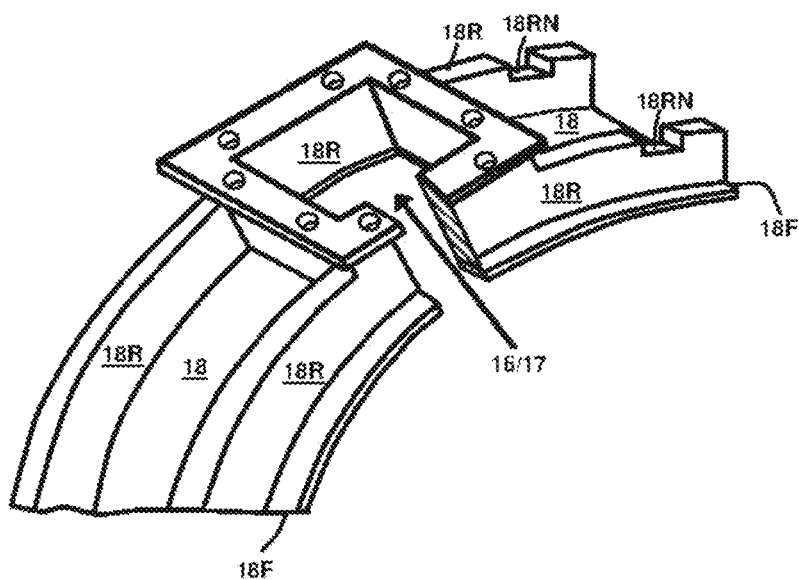
FIG. 15 is a perspective view of an input/output port in the chamber cover.

FIG. 15 shows the input/output port 16/17 in the chamber cover 18. The port design allows for the attachment of plumbing that is leak free, strong enough to withstand large pressure forces and large enough for unrestricted water flow. Another consideration is the position of the port 16/17 in the cover 18, with particular reference to the distance of the port opening in the cover 18 from the piston 10. When a gate 19 is under pressure it cannot be moved from its closed extended position to its open retracted position because the gate 19 is pressed tightly against its slot 14S. The transition of the gate 19 from a closed to an open position must occur between the locations of port 16/17 and the piston 10 where there is no pressure difference across the gate 19.

The cam track 32 in FIGS. 8A and 8B, which controls the radial movement of the gates 19, is designed to accommodate this transition range. The farther the opening of a port 16/17 is from the piston 10, the more degrees of rotation of the chamber 15 there are for the transition of the position of the gate 19. Referring to FIG. 1B, the input and output ports 16/17 of the chamber partitions 12PA and 12PB between two pistons 10 must be far enough apart so there can be two closed gates 19 between them as shown in FIG. 1B. The input and output ports 16/17 within the one hundred eighty degree chamber partition must be more than ninety degrees apart. Allowing one hundred degrees separation between ports leaves forty degrees of maximum distance between each port 16/17 and the piston 10. This gives the cam track 32, eighty degrees of chamber rotation for a full gate transition cycle going from closed to open back to closed.

Figure 16:
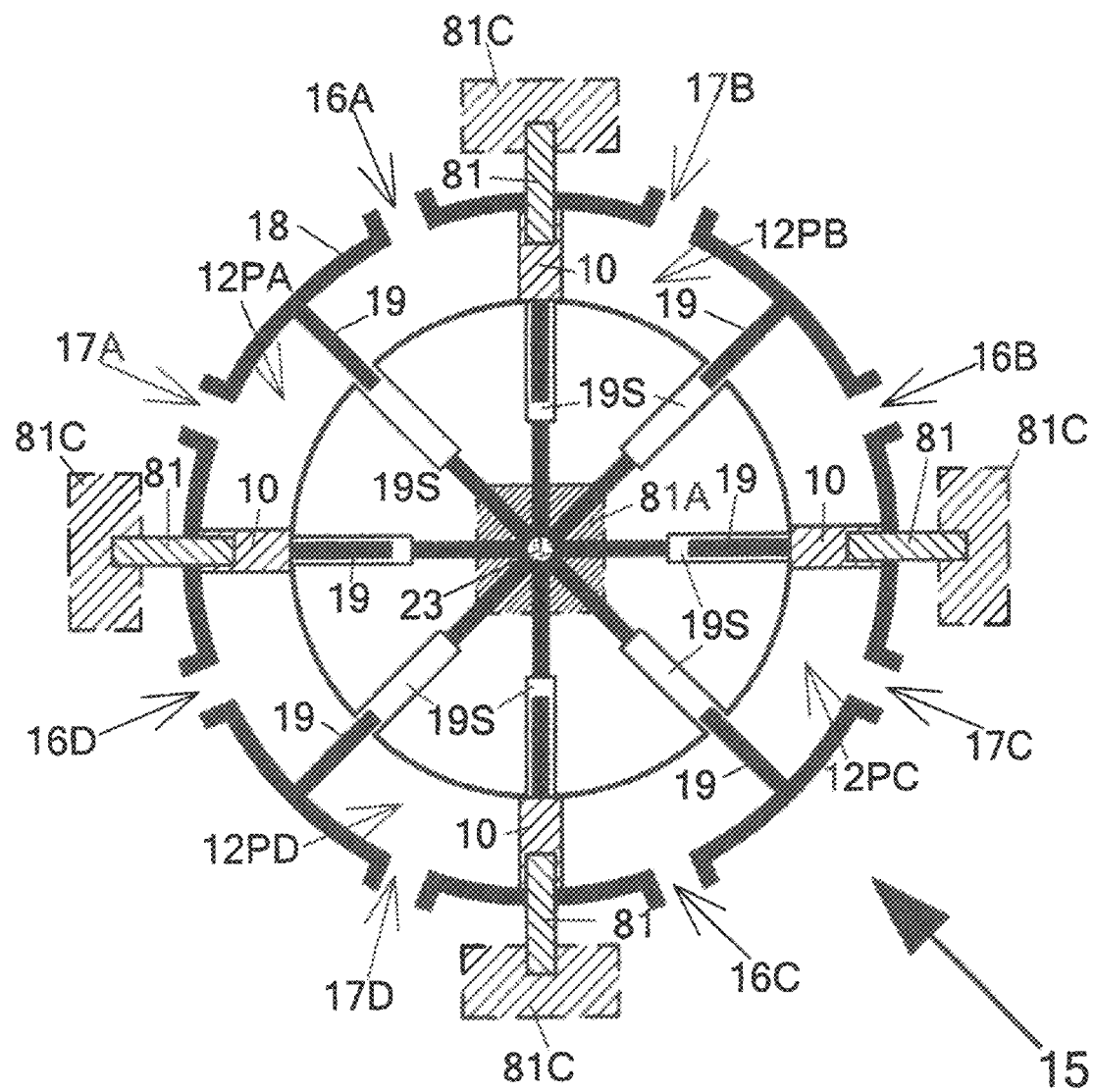
FIG. 16 is a schematic representation of the toroidal rotary piston chamber with four pistons.

FIG. 16 is a schematic drawing of the rotary chamber 15 with four stationary pistons 10. This forms four partitions 12PA, 12PB, 12PC, and 12PD in the toroidal rotary piston chamber 15, each partition with its own input port 16 and output port 17. The eight gates 19 are required so that at least one gate 19 is always closed in each partition. Four of the gates 19 are shown open, i.e. fully retracted at the moment of passing the position of a piston 10. The other four gates 19 are shown fully extended in the closed position in each partition 12PA, 12PB, 12PC, and 12PD. The eight gates 19 are equally spaced, at forty-five degrees separation. The two port openings, an input port 16 and an output port 17, in each partition must be more than forty-five degrees apart to allow for two closed gates 19. Allowing fifty degrees between ports leaves forty degrees of chamber rotation for the gate opening and closing cycle. The cam track 32 must be modified as will be well understood by those skilled in the art to accommodate this shorter transition distance as well as the addition of two more pistons 10.

When operating as a motor the four stationary piston configuration can produce twice the torque of a motor using two stationary pistons. For the same rotational speed the four pistons will have twice the input water flow and twice the output power at the axle-drive shaft 23. Since each partition between stationary pistons has its own input and output ports it is possible for the rotary chamber 15 to operate simultaneously as both a motor and a pump.

Figure 17:
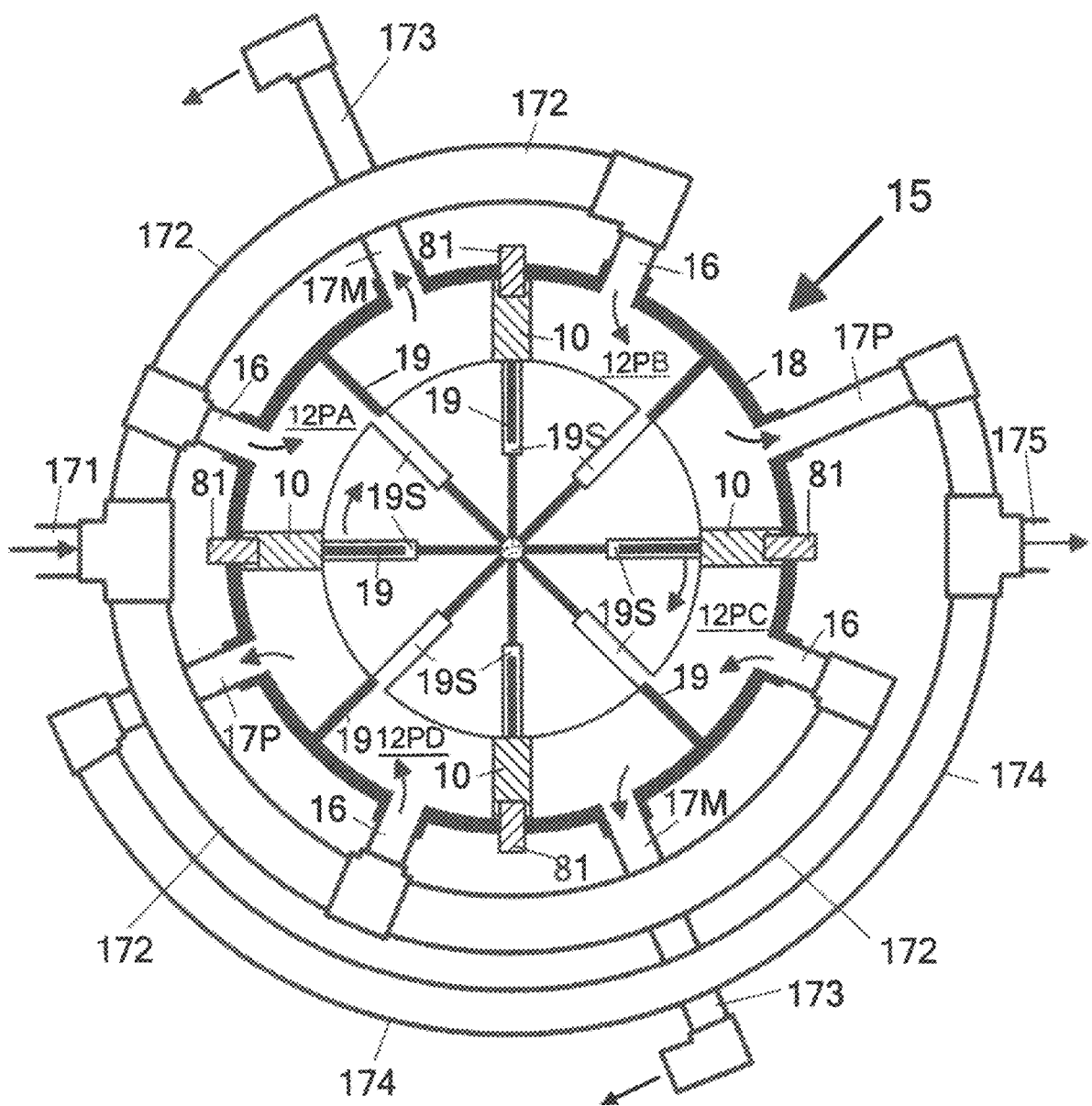
FIG. 17 shows the rotary chamber of FIG. 16 with external plumbing connected to provide the function of a hydraulic pressure multiplier.

FIG. 17 shows a four stationary piston rotary chamber 15 with input and output connections for the simultaneous operation as a hydraulic motor and as a pump that functions as a pressure multiplier. To operate as a motor with clockwise rotation the pressurized water input 171 is connected through pipe 172 to the clockwise input port 16 of each of the four partitions 12PA, 12PB, 12PC, and 12PD. The output ports 17P or 17M of each of the four partitions would normally be allowed to drain freely with no back pressure that would reduce the torque of the motor. As shown in FIG. 17 the two output ports 17P of partitions 12PB and 12PD are connected through pipe 174 to the output pipe 175. The two partitions 12PB and 12PD combine to operate as a pump. The gates 19 of the rotating chamber 15 push the water up through the pump output pipe 175 (to an upper level not shown) as well as out through the two drains 173. As the water rises in the pump output pipe 175 the pressure rises at the two output ports 17P of partitions 12PB and 12PD.

When the pressure at the output is equal to the input pressure there is no pressure difference across the gates 19 in the two pumping partitions 12PB and 12PD. The two partitions 12PA and 12PC with output port 17M each connected to a drain 173 continue to provide the full force of the input pressure to rotate the rotary chamber 15 clockwise and continue its pumping operation. As the water continues to rise in the pump output pipe 175 the counter clockwise force on the two gates 19 of the pumping partitions 12PB and 12PD rises. When the pressure at the pump output 175 is twice the pressure at the input 171 the counter clockwise force is equal to the clockwise force and the chamber rotation and the pumping action stop.

Input and output connections shown in FIG. 17 to the ports of the rotary chamber 15 must be made so that diametrically opposed partitions are connected in parallel. This is needed so that internal radial forces pushing outward on the chamber cover 18 are balanced with equal and opposite forces so there is no net force acting to displace chamber cover 18. Unbalanced forces would require strong external support to hold the cover 18 in position. FIG. 18 is a plumbing connection diagram of the four piston configuration where opposing partition pair 12PA and 12PC and partition pair 12PB and 12PD are each connected in parallel. These connections can be considered internal and must always remain connected.

Figure 18A:
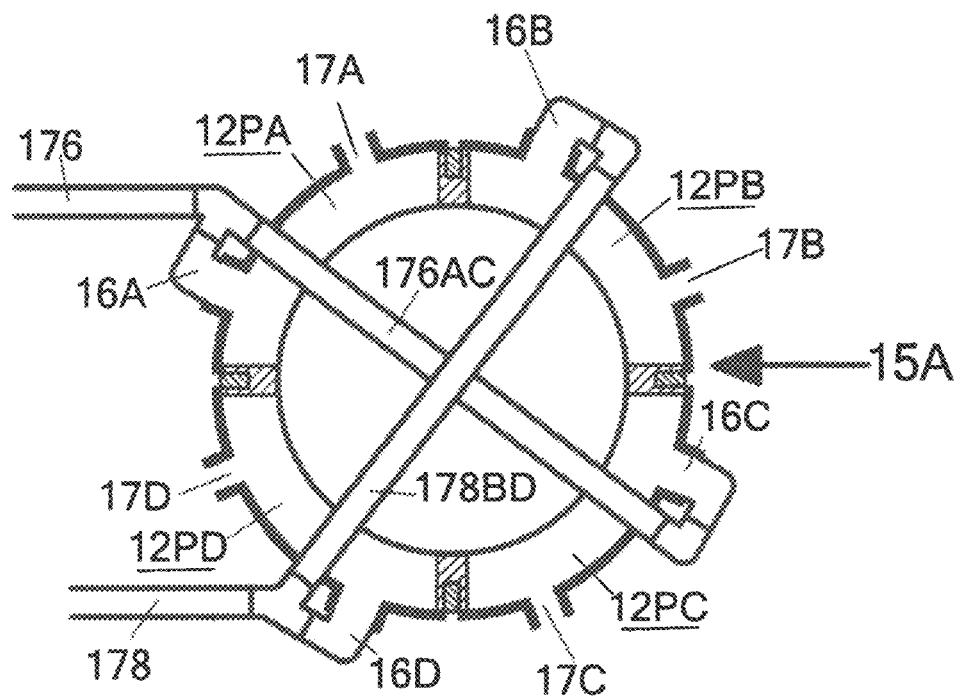
FIG. 18A and FIG. 18B show the rotary chamber of FIG. 16 showing the internal plumbing connections required for the operation of the rotary chamber in a variety of functions.
Figure 18B:
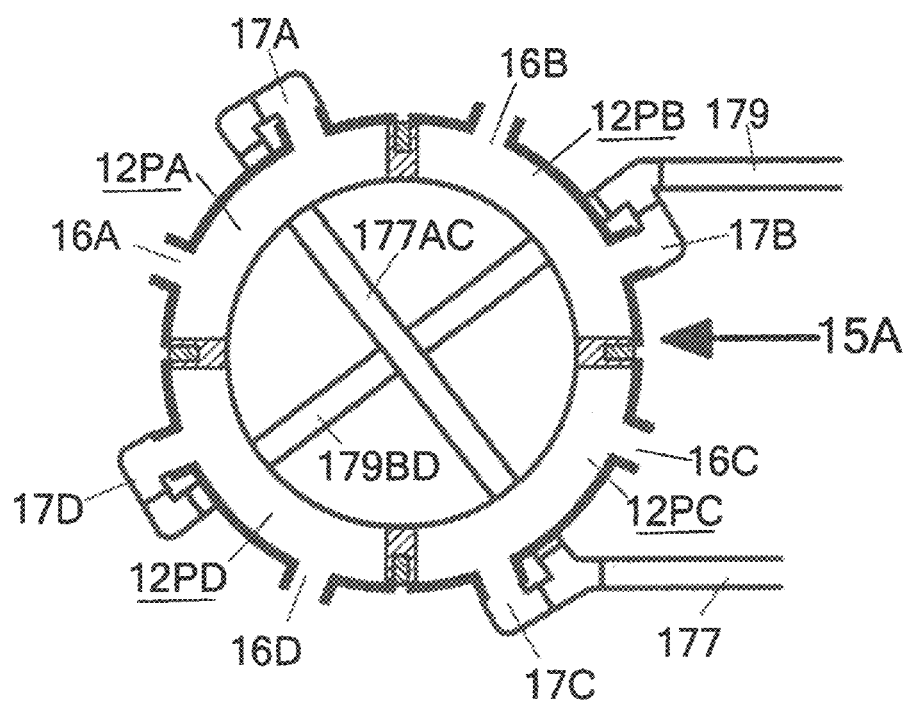

The connection diagram is shown in two parts, for clarity, in FIG. 18A and 18B which show the rotary piston chamber of FIG. 16 showing the internal plumbing connections required for the operation of the rotary piston chamber in a variety of functions.

FIG. 18A shows the connections for the four ports 16A, 16B, 16C and 16D, which provide the inputs for clockwise rotation or the outputs for counter clockwise rotation. Pipe 176 provides the external connection for partition pair 12PA and 12PC and pipe 176AC provides the internal connection to ports 16A and 16C. Pipe 178 provides the external connection for partition pair 12PB and 12PD and pipe 178BD provides the internal connection to ports 16B and 16D.

FIG. 18B shows the connections for the four ports 17A, 17B, 17C and 17D, which provide the inputs for counter clockwise rotation or the outputs for clockwise rotation. Pipe 177 provides the external connection for partition pair 12PA and 12PC and pipe 177AC provides the internal connection to ports 17A and 17C. Pipe 179 provides the external connection for partition pair 12PB and 12PD and pipe 179BD provides the internal connection to ports 17B and 17D. The four external connections 176/178 and 177/179 provide two inputs and two outputs for external connections as needed for various functions.

Figure 19:
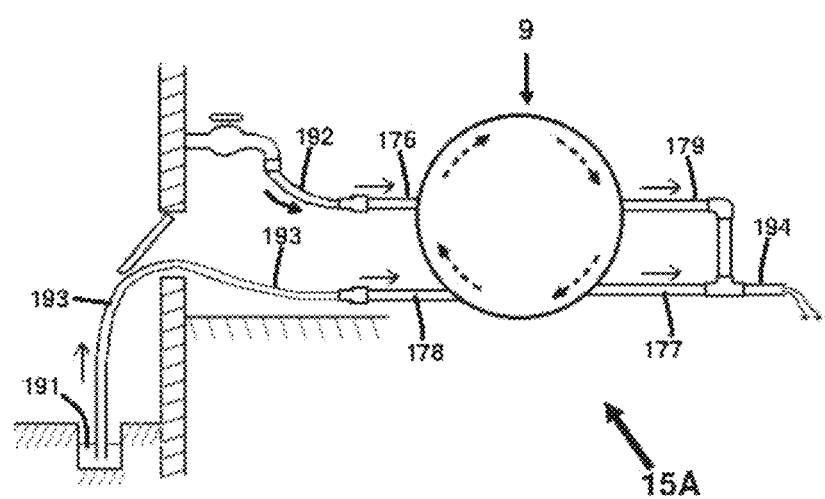
FIG. 19 is a diagram showing the use of the rotary chamber of FIG. 18 as a hydraulically powered sump pump.

FIG. 19 is a diagram showing the use of the rotary chamber 15A of FIG. 18 showing one example of such a four external connections function comprising a hydraulically powered sump pump. This is achieved by connecting only one input 176 to a source of pressurized water 192 and both outputs 177 and 179 to drain 194. This results in a rotating chamber with suction at the open input 178. Water can be pumped out of a basement, for example, by connecting a hose 193 from the basement sump pit 191 to the open input 178 of the rotary chamber machine 9. The volume of supply water used is equal to the volume of pumped water.

Figure 20A:
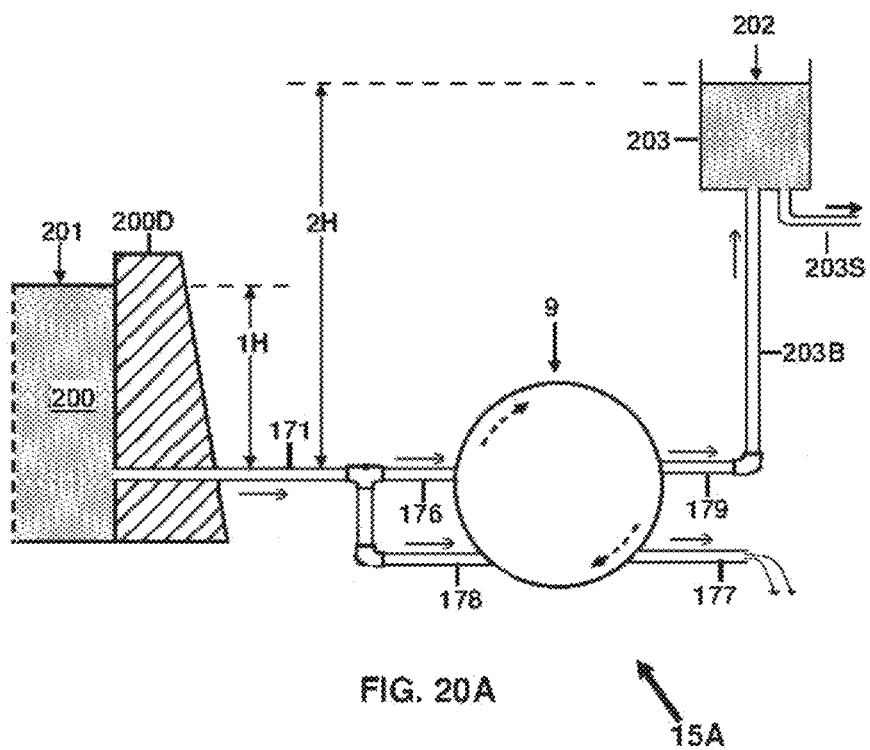
FIG. 20A is a diagram showing the use of the rotary chamber of FIG. 18 to hydraulically pump water to a level above a source reservoir for wider distribution or pumped energy storage.

FIG. 20A is a diagram showing the use of the rotary chamber 15A of FIG. 18 to hydraulically pump water to an elevated level above a source reservoir. The diagram shows wider distribution or pumped energy storage as an application for the pressure multiplier function. A four piston rotary chamber 15A with plumbing connections functionally similar to that of FIG. 17 is depicted with a reservoir 200 behind a dam 200D as the water source for the input 171, which supplies the motor function inputs 176 and 178. The input pressure is determined by the height of the reservoir level 201. As explained in the description of FIG. 17 the input water pressure rotates the chamber as a motor which in turn pumps the water in a steady flow to the output pipe 179 and from there through pipe 203B to the storage tank 203, or an upper level reservoir (not shown).

The water in the storage tank 203 can then be distributed through pipe 203S for use at levels above the source reservoir 200. The pump action and the flow of input water from the source reservoir stops when the water level 202 in the storage tank 203 is twice the height 201 of the source. From the volume of input water flowing through pipe 171, half goes through pipe 179 to the storage tank 203 and half is drained away through pipe 177. The potential energy of the pumped water in the storage tank 203 at half the volume and twice the height is equal to the potential energy of the source input water.

In hydroelectric facilities the turbine that drives the generator works best with high input water pressure. In locations with low dams the water level is not suitable for a turbine. The rotary chamber machine by increasing the water pressure input to the turbine with little loss of the potential energy of the water can make otherwise unsuitable locations useful for hydroelectric power. As shown in FIG. 20C the combination of two rotary chamber machines 9 and 2B operating as pressure multipliers connected in series will provide increased water pressure, for example sixteen times higher than the source. Still higher increased water pressure can be obtained with the first rotary chamber machine 9 operating as a four piston hydraulic motor with its output drive shaft 23 driving a second smaller two piston rotary chamber machine 9B as a pump, and having input 176B and output pipe 179B. The pressure multiplication is the ratio of the motor to pump piston areas multiplied by the ratio of the motor to pump diameters, A two piston pump half the size of a four piston motor will pump water to a height-signified by the uppermost height of water level 202B in storage tank 203-sixteen times higher 16H than the height of the input water source to the motor.

Figure 20B:
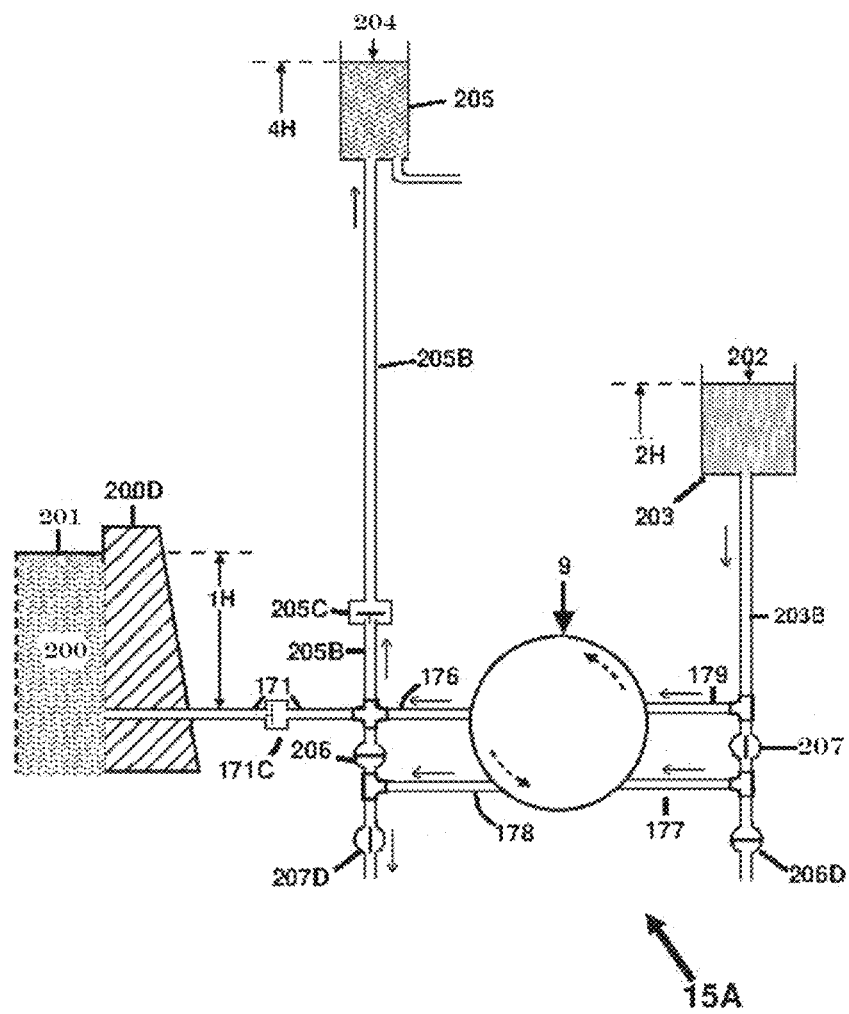
FIG. 20B is a diagram showing the use of the elevated water obtained in the operation shown in FIG. 20A as a source to operate the rotary chamber in reverse to pump water to a greater height.
Figure 20C:
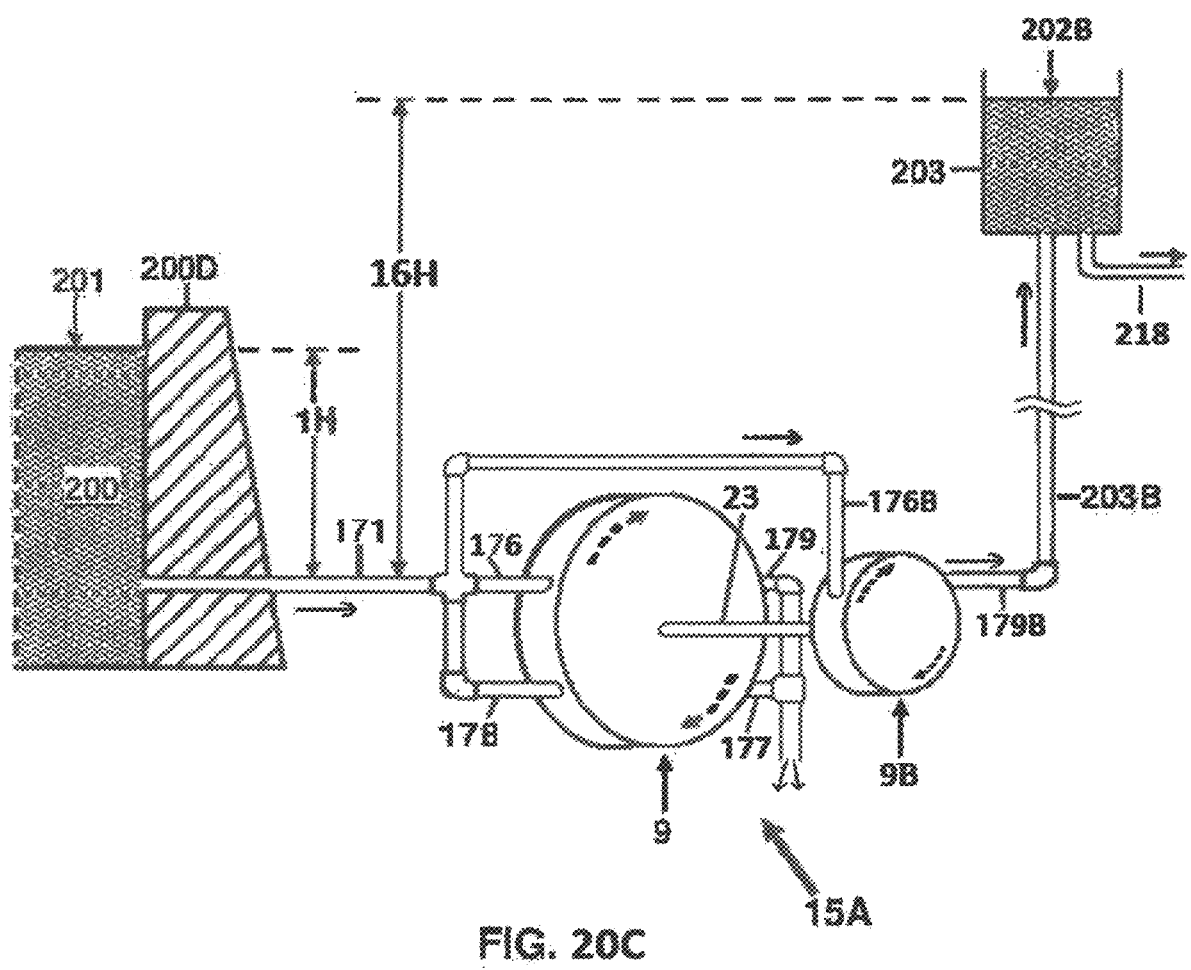
FIG. 20C is a diagram showing the use of a four piston motor in series with a two piston pump, to hydraulically pump water to a level significantly above a source reservoir.

FIG. 20B is a diagram showing the use of the elevated water obtained in the operation shown in FIG. 20A as a source to operate the rotary chamber 15A of FIG. 18 in reverse to pump water to a greater height. The diagram shows one rotary chamber 15A used as a pressure multiplier can provide an output pressure four times the source input pressure using a two step process. The first step is to pump to the storage tank 203 shown in FIG. 20A. With both step one valves 206 and 206D open, the plumbing configuration is equivalent to that shown in FIG. 20A. In the second step the step two valves 207 and 207D are open to reconfigure the external plumbing so the rotary chamber 15A functions as a pressure multiplier operating in the reverse direction. The storage tank 203 with water at height 202, which is twice the height 201 of the reservoir 200, is the water source through pipe 203B to the pressure multiplier inputs 179 and 177. The water is pumped through output 176 up through check valve 205C through pipe 205B to the upper storage tank 205 at height 204 which is twice the height 202 of the storage tank 203 or four times the height 201 of the reservoir 200.

A wind farm with the purpose of harvesting wind energy and converting it to electricity typically has an array of large wind turbines each with its own electric generator. With the use of the rotary chamber machine, it is possible to have an array of simpler windmills with one large central electric generator. Such a system also has the ability for storing the harvested energy.

Figure 21:
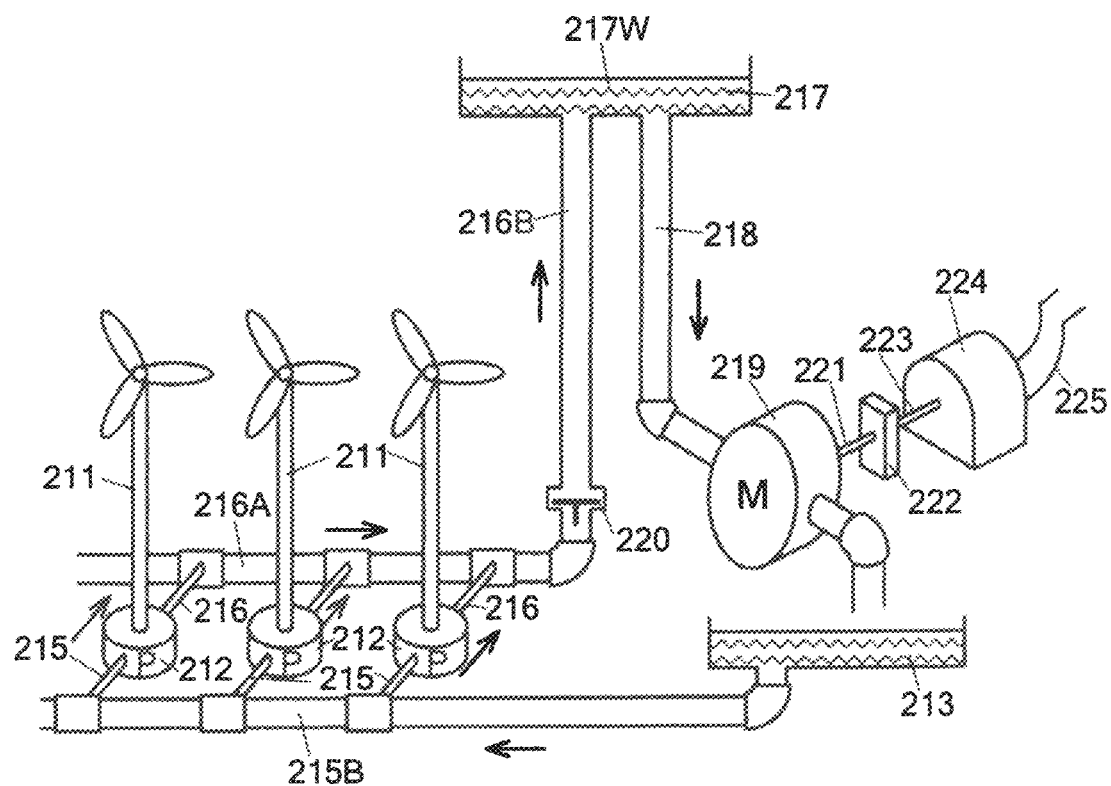
FIG. 21 is a diagram showing a wind farm where each windmill drives a rotary chamber pump to store the energy in elevated water which is used for hydroelectric generation. A rotary chamber is shown being used as a motor driving a hydroelectric generator.

FIG. 21 shows a wind farm comprising windmills 211 without electric generators where each windmill 211 drives a rotary chamber machine 212 to pump water through pipe 216 to output supply pipe 216B to an elevated reservoir or pumped water tank 217. The pumped water 217W collected from all the windmills 211 drives a single hydroelectric generator 224 to provide the output electricity 225.

The motor 219 driving the generator 224 is a rotary chamber machine designed with multiple pistons to accommodate a range of water flow rates through motor supply pipe 218. The water discharged from the motor 219 to the return water tank 213 is returned by gravity flow through pipe 215B to input pipe 215 of the pumps 212 to be recycled. Continuous new water supply is not required. The pump 212, at the base of each windmill 211, designed with multiple pistons can accommodate a range of wind speed/power input from the windmill. The pump 212 is driven by a vertical drive shaft from the windmill 211 pod which in turn is driven by bevel gears (not shown) connected within the windmill 211 hub.

A check valve 220 is required to keep pumped water from flowing back when wind speeds are low. Connecting the pumped water output 216B directly to the hydraulic motor 219 (not shown) during times of high wind would enable the motor 219 to operate with higher input water pressure than is available from the elevated water tank 217. This would provide more load control to optimize the power output from the windmills.

The rotary chamber motor 219 has a large chamber diameter and pistons with a large area to provide high torque with relatively low input water pressure. A gear box 222 increases the rotation rate of the motor output drive shaft 221 to the high rotation rate required at the input drive shaft 223 to the electric generator 224. The average wind speed determines the average rate at which pumped water 217W is provided to the pumped water reservoir 217. The power output of motor 219 and thus the electric power output can be controlled to be consistent with the pumped water flow rate.

What is claimed is:
1. A wind farm comprising:
a plurality of bidirectional rotary hydraulic motor/pump devices, each of said plurality of bidirectional hydraulic motor/pump devices comprising:
  a rotary toroidal piston chamber having a rectangular space with a bottom, two sidewalls, and an open top;
  four stationary pistons and two retractable gates for each of said four stationary pistons within said rotary toroidal piston chamber mounted on a chamber wheel fixed to an axle on which it rotates, wherein said four stationary pistons and said two retractable gates are evenly spaced around said rotary toroidal piston chamber separating said toroidal chamber into four partitions;
  a piston support for each of said four stationary pistons configured to hold each of said four stationary pistons stationary while said rotary toroidal piston chamber rotates;
  a stationary cover that encircles and seals said open top of said rotary toroidal piston chamber wherein openings through said stationary cover allow each of said piston supports to pass through and be sealed; and
  an input port opening and an output port opening in said stationary cover for each of said four partitions;
  wherein said rotary toroidal piston chamber is configured to rotate by reacting directly to continuous hydraulic force on said four stationary pistons;
a plurality of windmills, each of said plurality of windmills driving each of a plurality of first bidirectional rotary hydraulic motor/pump devices of said plurality of bidirectional rotary hydraulic motor/pump devices to pump water through an outlet supply pipe to an elevated water tank; and
a single hydroelectric generator driven by a second bidirectional rotary hydraulic motor/pump devices of said plurality of bidirectional rotary hydraulic motor/pump devices using as input said water in said elevated water tank, wherein water discharged from said second bidirectional rotary hydraulic motor/pump device is configured to be recycled to said plurality of first bidirectional rotary hydraulic motor/pump devices.

2. The wind farm of claim 1 wherein for each of said plurality of bidirectional rotary hydraulic motor/pump devices, each of said two retractable gates is configured to retract to an open position as it passes each of said four stationary pistons and to return to a closed condition after it passes each of said four stationary pistons which allows for unobstructed continuous rotation of said rotary toroidal piston chamber and further comprising a control outside of said chamber wheel configured to control opening and closing of said two retractable gates.

3. The wind farm of claim 1 wherein each of said plurality of bidirectional rotary hydraulic motor/pump devices further comprises:
  a pressurized water input connected through a pipe to each of said input port openings in each of said four partitions; and
  two of said output port openings in opposite partitions of said four partitions are connected to a single outlet pipe whereby those two opposite partitions of said four partitions are configured to operate as a pump with pressure multiplier.

4. The wind farm of claim 1 further comprising:
  a gear box configured to increase a rotation rate of an output drive shaft of said second one of said plurality of bidirectional rotary hydraulic motor/pump devices to a high rotation rate required at an input drive shaft to said single hydroelectric generator.

5. The wind farm of claim 4 wherein power output of said second one of said hydraulic motor/pump devices is controlled to be consistent with a flow rate of water pumped by said plurality of first bidirectional rotary hydraulic motor/pump devices.

6. A hydroelectric facility comprising:
  a first bidirectional rotary hydraulic motor/pump device comprising:
    a first rotary toroidal piston chamber having a rectangular space with a bottom, two sidewalls, and an open top;
    four first stationary pistons and two first retractable gates for each of said four first stationary pistons within said first rotary toroidal piston chamber mounted on a first chamber wheel fixed to a first axle on which it rotates, wherein said four first stationary pistons and said two first retractable gates are evenly spaced around said first rotary toroidal piston chamber separating said first rotary toroidal piston chamber into four first partitions;
    a first piston support for each of said four first stationary pistons configured to hold said first stationary piston support stationary while said first rotary toroidal piston chamber rotates;
    a first stationary cover that encircles and seals said open top of said first rotary toroidal piston chamber wherein openings through said first stationary cover allow each of said first piston supports to pass through and be sealed; and
    a first input port opening and a first output port opening in said first stationary cover for each of said four first partitions;
    wherein said first rotary toroidal piston chamber is configured to rotate by reacting directly to continuous hydraulic force on said four first stationary pistons; and
  a second bidirectional rotary hydraulic motor/pump device, smaller than said first bidirectional rotary hydraulic motor/pump device, comprising:
    a second rotary toroidal piston chamber having a rectangular space with a bottom, two sidewalls, and an open top;
    two second stationary pistons and two second retractable gates for each second stationary piston within said second rotary toroidal piston chamber mounted on a second chamber wheel fixed to a second axle on which it rotates, wherein said two second stationary pistons and said two second retractable gates are evenly spaced around said second rotary toroidal chamber separating said second rotary toroidal chamber into two second partitions;
    a second piston support for each of said two second stationary pistons configured to hold each of said two second stationary pistons stationary while said second rotary toroidal piston chamber rotates;
    a second stationary cover that encircles and seals said open top of said second rotary toroidal piston chamber wherein openings through said second stationary cover allow each of said second piston supports to pass through and be sealed; and
    a second input port opening and a second output port opening in said second stationary cover for each of said two second partitions;
    wherein said second rotary toroidal piston chamber is configured to rotate by reacting directly to continuous hydraulic force on said two second stationary pistons;
  wherein said first and second bidirectional rotary hydraulic motor/pump devices are mechanically connected in series to operate as a pressure multipliers with high multiplication, wherein said first bidirectional rotary hydraulic motor/pump device operates as a four piston hydraulic motor with its output drive shaft driving said second bidirectional rotary hydraulic motor/pump device operating as a two piston hydraulic pump.

7. The hydroelectric facility of claim 6 wherein for said first bidirectional rotary hydraulic motor/pump device, each of said two first retractable gates is configured to retract to an open position as it passes each of said four first stationary pistons and to return to a closed condition after it passes each of said four first stationary pistons which allows for unobstructed continuous rotation of said first rotary toroidal piston chamber and further comprising a first control outside of said first chamber wheel configured to control opening and closing of said two first retractable gates.

8. The hydroelectric facility of claim 7 wherein said first control comprises a first cam mechanism mounted to said first piston support wherein said first cam mechanism comprise a cam track or a single surface cam with a spring.

9. The hydroelectric facility of claim 6 wherein for said second bidirectional rotary hydraulic motor/pump device, each of said two second retractable gates is configured to retract to an open position as it passes each of said two second stationary pistons and to return to a closed condition after it passes each of said two second stationary pistons which allows for unobstructed continuous rotation of said second rotary toroidal piston chamber and further comprising a second control outside of said second chamber wheel configured to control opening and closing of said two second retractable gates.

10. The hydroelectric facility of claim 9 wherein said second control comprises a second cam mechanism mounted to said second piston support wherein said second cam mechanism comprises a cam track or a single surface cam with a spring.

11. The hydroelectric facility of claim 6 wherein said first bidirectional rotary hydraulic motor/pump device operating as a motor comprises:

water under pressure enters through said first input port into a closed chamber section formed by one of said four first stationary pistons at one end and a first retractable gate of said two first retractable gates in a closed position at the other end;

a force of water pressure on said one of said four first stationary pistons and said first retractable gate of said two first retractable gates acts to push them apart, thereby providing torque to rotate said first rotary toroidal piston chamber; and when a steady flow of water enters said closed chamber section, said first axle turns at constant velocity continuously and with constant torque.

12. The hydroelectric facility of claim 6 wherein said second rotary bidirectional hydraulic motor/pump device operating as a pump comprises:

input torque applied to said second axle rotates said second rotary toroidal piston chamber;

an expanding closed chamber section formed by one of said two second stationary pistons at one end and a first retractable gate of said two second retractable gates in a closed position at the other end draws available water through said second input port into said expanding closed chamber section; and a contracting closed chamber section formed by one of said two second stationary pistons at one end and the first retractable gate of said two second retractable gates in a closed position at the other end produces continuous hydraulic pressure to discharge water through said second output port.

* * * * *